(12) United States Patent
Aharoni et al.

(10) Patent No.: US 12,334,049 B2
(45) Date of Patent: Jun. 17, 2025

(54) UNSTRUCTURED DESCRIPTION-BASED CHATBOT DEVELOPMENT TECHNIQUES

(71) Applicant: GOOGLE LLC, Mountain View, CA (US)

(72) Inventors: Asaf Aharoni, Ramat Hasharon (IL); Eyal Segalis, Tel Aviv (IL); Sasha Goldshtein, Tel Aviv (IL); Ofer Ron, Givatayim (IL); Yaniv Leviathan, New York, NY (US); Yoav Tzur, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 295 days.

(21) Appl. No.: 18/074,799

(22) Filed: Dec. 5, 2022

(65) Prior Publication Data

US 2024/0185834 A1 Jun. 6, 2024

(51) Int. Cl.
*G10L 13/08* (2013.01)
*G10L 15/22* (2006.01)

(52) U.S. Cl.
CPC .............. *G10L 13/08* (2013.01); *G10L 15/22* (2013.01); *G10L 2015/221* (2013.01); *G10L 2015/223* (2013.01)

(58) Field of Classification Search
CPC .............. G10L 13/08; G10L 2015/221; G10L 2015/223; G10L 15/10; G10L 15/14; G10L 15/22; G06F 40/35; H04L 51/21
See application file for complete search history.

(56) References Cited

U.S. PATENT DOCUMENTS

| 1,069,897 A1 | 6/2020 | Rajagopal et al. |
| 10,923,109 B2 | 2/2021 | Chakraborty et al. |

(Continued)

FOREIGN PATENT DOCUMENTS

| CN | 108229686 | 6/2018 |
| GB | 2367402 | 4/2002 |

OTHER PUBLICATIONS

Gopalakrishnan, K. et al.., "Are Neural Open-Domain Dialog Systems Robust to Speech Recognition Errors in the Dialog History? An Empirical Study:" arXiv.org, arXiv.2008.07683v1; 5 pages; dated Aug. 18, 2020.

(Continued)

*Primary Examiner* — Mohammad K Islam
(74) *Attorney, Agent, or Firm* — Gray Ice Higdon

(57) ABSTRACT

Implementations are directed to receiving unstructured free-form natural language input, generating a chatbot based on the unstructured free-form natural language input and in response to receiving the unstructured free-form natural language input, and causing the chatbot to perform task(s) associated with an entity and on behalf of the user. In various implementations, the unstructured free-form natural language input conveys details of the task(s) to be performed, but does not define any corresponding dialog state map (e.g., does not define any dialog states or any dialog state transitions). Nonetheless, the unstructured free-form natural language input may be utilized to fine-tune and/or prime a machine learning model that is already capable of being utilized in conducting generalized conversations. As a result, the chatbot can be generated and deployed in a quick and efficient manner for performance of the task(s) on behalf of the user.

20 Claims, 9 Drawing Sheets

(56) References Cited

U.S. PATENT DOCUMENTS

| | | | |
|---|---|---|---|
| 11,113,475 B2 | 9/2021 | Sampat et al. | |
| 11,164,562 B2* | 11/2021 | DiMascio | G10L 15/063 |
| 11,373,131 B1 | 6/2022 | Venugopal | |
| 11,657,797 B2* | 5/2023 | Vishnoi | G06N 20/00 |
| | | | 704/260 |
| 11,941,367 B2* | 3/2024 | Lewis | G06N 5/041 |
| 12,190,064 B2* | 1/2025 | Millius | H04M 3/4931 |
| 2015/0278706 A1 | 10/2015 | Shivashankar et al. | |
| 2017/0300831 A1 | 10/2017 | Gelfenbeyn et al. | |
| 2017/0330077 A1 | 11/2017 | Williams et al. | |
| 2017/0359463 A1* | 12/2017 | Segalis | H04M 3/42042 |
| 2019/0102078 A1 | 4/2019 | Bhatt et al. | |
| 2019/0206393 A1 | 7/2019 | Fang et al. | |
| 2019/0325868 A1* | 10/2019 | Lecue | G10L 25/63 |
| 2019/0378015 A1 | 12/2019 | Lin et al. | |
| 2020/0090651 A1 | 3/2020 | Tran et al. | |
| 2020/0097544 A1 | 3/2020 | Alexander et al. | |
| 2020/0341970 A1 | 10/2020 | Rodrigues | |
| 2020/0342032 A1 | 10/2020 | Subramaniam et al. | |
| 2020/0342873 A1* | 10/2020 | Teserra | G06F 40/295 |
| 2020/0344185 A1 | 10/2020 | Singaraju et al. | |
| 2021/0067470 A1* | 3/2021 | Freed | G06F 18/23 |
| 2021/0144106 A1* | 5/2021 | Chen | G06F 40/35 |
| 2021/0312260 A1 | 10/2021 | Wu | |
| 2022/0027568 A1* | 1/2022 | Millius | G06F 40/30 |
| 2022/0050968 A1* | 2/2022 | Xie | H04L 51/02 |
| 2022/0107802 A1 | 4/2022 | Rao | |
| 2022/0180857 A1 | 6/2022 | Aharoni et al. | |
| 2022/0230632 A1 | 7/2022 | Maitra | |
| 2022/0247700 A1* | 8/2022 | Bhardwaj | G06N 3/044 |
| 2023/0142339 A1* | 5/2023 | Getselevich | G10L 15/16 |
| | | | 704/275 |
| 2023/0245651 A1* | 8/2023 | Wang | G06N 5/022 |
| | | | 704/275 |
| 2023/0274095 A1* | 8/2023 | Kelkar | G06F 40/49 |
| | | | 704/9 |
| 2023/0342554 A1* | 10/2023 | Millius | H04M 3/4931 |
| 2024/0184992 A1* | 6/2024 | Yannam | G06F 40/35 |
| 2024/0283868 A1* | 8/2024 | Ferris | G10L 15/22 |
| 2025/0013821 A1* | 1/2025 | Chittari | G06F 3/04847 |
| 2025/0016267 A1* | 1/2025 | Willshire | G06F 16/22 |

OTHER PUBLICATIONS

Daniel, G. Cabot, J. et al.; Xatkit: A Multimodal Low-Code Chatbot Development Framework; in IEEE Access: vol. 8: pp. 15332-15346; dated 2020.

Patel, P. et al., "Google Duplex—A Big Leap in the Evolution of Artificial Intelligence"; International Journal of Computer Applications, vol. 174, No. 13; 4 pages; dated Jan. 15, 2021.

Gupta, P. et al., "InstructDial: Improving Zero and Few-shot Generalization in Dialogue through Instruction Tuning"; arXiv.org, Cornell University; arXiv:2205.12673v2; 22 pages; dated Oct. 26, 2022.

Yu, J. et al., "Xdai: A Tuning-free Framework for Exploiting Pre-trained Language Models in Knowledge Grounded Dialogue Generation"; The Adjunct Publication of the 35th Annual ACM Symposium on User Interface Software and Technology; pp. 4422-4432; dated Aug. 14, 2022.

Wang, H. et al., "Pre-Trained Language Models and Their Applications"; Science Digest; Engineering; 44 pages; dated Sep. 2022.

Yao, J. et al., "Edge-Cloud Polarization and Collaboration: A Comprehensive Survey for AI"; IEEE Transactions on Knowledge and Data Engineering; retrieved from internet: arXiv.org; arXiv:2111.06061; 20 pages; dated May 23, 2022.

European Patent Office; International Search Report and Written Opinion issued in Application No. PCT/US2022/052012; 15 pages; dated Aug. 29, 2023.

\* cited by examiner

UNSTRUCTURED DESCRIPTION-BASED CHATBOT DEVELOPMENT TECHNIQUES

BACKGROUND

Humans may engage in human-to-computer dialogs with interactive software applications referred to as "chatbots," "voice bots", "automated assistants", "interactive personal assistants," "intelligent personal assistants," "conversational agents," etc. via a variety of computing devices. As one example, these chatbots may correspond to a machine learning model or a combination of different machine learning models, and may be utilized to perform various tasks on behalf of users. For instance, some of these chatbots can conduct conversations with various humans to perform action(s) on behalf of another human or on behalf of an entity. In some of these instances, the conversations can include voice-based conversations, such as conversations conducted locally at a computing device, conducted remotely over multiple computing devices via a telephonic network, or other voice-based scenarios. In other instances, the conversations can include text-based conversations, such as conversations conducted via text or SMS messaging, email, and/or other text-based scenarios.

However, functionality of some of these chatbots may be limited in various manners. For example, functionality of some of these chatbots may be limited by pre-defined intent schemas that the chatbots utilize to perform the action(s). In other words, if a human that is engaged in a given conversation with a given chatbot provides a spoken utterance that is determined to include an intent not defined by the pre-defined intent schemas, the given chatbot may fail. Further, to update these chatbots, existing intent schemas may be modified or new intent schemas may be added. As another example, functionality of some of these chatbots may be limited by a corpus of examples utilized to train the chatbots. In other words, if a human that is engaged in a given conversation with a given chatbot provides a spoken utterance that was not included in the given corpus of examples, the given chatbot may fail. Further, to update these chatbots, existing examples in the corpus may be modified or new examples may be added. However, in both of these examples, there are virtually limitless intent schemas and/or examples that may need to be previously defined to make the bots robust to various nuances of human speech and to mitigate instances of failure.

Notably, extensive utilization of computational resources is required to manually define and/or manually refine such intent schemas and/or examples. Further, even if a large quantity of intent schemas and/or examples are defined, a large amount of memory is required to store and/or utilize the large quantity of intent schemas for these chatbots, and/or to train these chatbots based on the large quantity of examples in the corpus. Accordingly, intent schemas for rules-based chatbots and examples for example-based chatbots are not practically scalable to the extent of learning the nuances of human speech.

SUMMARY

Implementations are directed to receiving unstructured free-form natural language input, generating a chatbot based on the unstructured free-form natural language input and in response to receiving the unstructured free-form natural language input, and causing the chatbot to perform task(s) associated with an entity and on behalf of the user. In some versions of those implementations, the unstructured free-form natural language input conveys details of the task(s) to be performed, but does not define any corresponding dialog state map (e.g., does not define any dialog states or any dialog state transitions). Further, the unstructured free-form natural language input is not provided according to any schema. Nonetheless, the unstructured free-form natural language input may be utilized to fine-tune a machine learning model (ML) that is already capable of being utilized in conducting more generalized conversations and/or may be utilized as input across the ML model without the ML model being fine-tuned. As a result, the chatbot can be generated and deployed in a quick and efficient manner for performance of the task(s) on behalf of the user.

For example, assume that the unstructured free-form natural language input corresponds to a spoken utterance of "ask the restaurant I ate dinner at yesterday if they found my red leather jacket" is received at a client device of a user. Processor(s) can use various automatic speech recognition (ASR), natural language understanding (NLU), and/or fulfillment techniques to determine that the unstructured free-form natural language input includes task(s) to be performed by a chatbot. In this example, the task(s) may include, for instance, submitting a query to the "restaurant [the user] ate dinner at yesterday" of "did you find [the user's] red leather jacket". Further, the processor(s) can generate a chatbot to engage in a corresponding conversation with a representative of the "restaurant" to submit the query, and determine responsive content to be provided for presentation to the user of the client device based on the corresponding conversation with the representative of the "restaurant". Although the above example is described with respect to a relatively simple query (e.g., submitting the query), it should be understood that is for the sake of example and that the same or similar techniques may be utilized in performance of relatively complex tasks that may include multiple other tasks or sub-tasks that may be performed during the corresponding conversation.

In various implementations, the corresponding conversation may be a voice-based conversation where the chatbot engages in the corresponding conversation over a phone call or locally at the client device. In these implementations, the chatbot may additionally or alternatively be referred to as a voice bot. In other implementations, the corresponding conversation may be a text-based conversation where the chatbot engages in the corresponding conversation with a text messaging or SMS service, an email service, or other text-based service. Accordingly, the chatbot may be deployed in various environments to engage in corresponding conversations with various entities to perform various tasks. In some implementations, the chatbots that are generated to perform the various tasks can be fine-tuned in an "on the fly" manner such that the chatbots are generated in response to receiving the unstructured free-form natural language input. While some chatbots may be utilized in engaging in corresponding conversations with multiple disparate entities (e.g., in a parallel manner or in a serial manner), a corresponding chatbot may be generated based on each instance of unstructured free-form natural language input provided by the user that include(s) task(s) to be performed on behalf of the user. In other implementations, the chatbots that are generated may not be fine-tuned in an "on the fly" manner, but they can be identified and utilized in response to receiving the unstructured free-form natural language input.

In various implementations, the processor(s) may be implemented locally at the client device of the user at which the unstructured free-form natural language input that conveys details of the task(s) to be performed is received. In these implementations, the processor(s) may obtain, from on-device storage of the client device, a previously trained large language model (LLM) as the ML model that is already capable of being utilized in conducting more generalized conversations. Further, the processor(s) may, based on the unstructured free-form natural language input, fine-tune the previously trained LLM to generate a fine-tuned LLM. Moreover, the processor(s) utilize the fine-tuned LLM as the chatbot that engages in the corresponding conversations on behalf of the user. In other versions of these implementations, the processor(s) may obtain, from the on-device storage of the client device, the previously trained LLM as the ML model that is already capable of being utilized in conducting more generalized conversations, but refrain from fine-tuning the previously trained LLM based on the unstructured free-form natural language input.

In other implementations, the processor(s) may be implemented remotely from the client device of the user (e.g., at a remote system, such as a high-performance server or cluster of high-performance servers). In these implementations, the processor(s) may obtain, from remote storage of a remote system, a previously trained large language model (LLM) as the ML model that is already capable of being utilized in conducting more generalized conversations. Further, the processor(s) may generate the fine-tuned LLM and utilize the fine-tuned LLM as the chatbot that engages in the corresponding conversations on behalf of the user. Continuing with the above example, the processor(s) can cause the chatbot to process respective data to cause the query to be submitted during the corresponding conversation to determine whether the user left his or her jacket at the restaurant that he or she ate at the previous night. In some versions of these implementations, the processor(s) may obtain, from the remote storage of the remote system, the previously trained LLM as the ML model that is already capable of being utilized in conducting more generalized conversations, but refrain from fine-tuning the previously trained LLM based on the unstructured free-form natural language input.

Notably, the previously trained LLM may correspond to an existing LLM such as LaMDA, BERT, Meena, GPT-3, and/or any other previously trained LLM. These previously trained LLMs have been previously trained on enormous amounts of diverse data and are capable of engaging in corresponding conversations with users in a natural and intuitive manner. However, these LLMs have a plurality of ML layers and hundreds of millions to hundreds of billions of ML parameters. Accordingly, in implementations where the fine-tuned chatbot is generated locally at the client device, the previously trained LLM that is obtained and fine-tuned may be a sparsified version of the previously trained LLM. In contrast, in implementations where the fine-tuned chatbot is generated remotely from the client device, the previously trained LLM that is obtained and fine-tuned may be an unsparsified version of the previously trained LLM. The sparsified version of the previously trained LLM may have fewer ML layers, fewer ML parameters, masked weights, and/or other sparsified aspects to reduce the size of the previously trained LLM due to various hardware constraints and/or software constraints at the client device compared to the virtually limitless resources of the remote system.

In some implementations, and in causing the chatbot to engage in the corresponding conversations, the processor(s) can process, using the fine-tuned LLM that corresponds to the chatbot, task data (e.g., output generated using the ASR model(s), NLU model(s), and/or fulfillment model(s) or rule(s), and based on processing the unstructured free-form natural language input), audio data capturing any spoken inputs of the representative of the entity, textual data that is predicted to correspond to the audio data capturing any spoken inputs of the representative of the entity, any conversation context data, and/or any other data described herein, to generate output. In other implementations, and in causing the chatbot to engage in the corresponding conversation, the processor(s) can process, using the previously trained LLM (e.g., that is not fine-tuned), the natural language description included in the unstructured free-form natural language input, task data, audio data capturing any spoken inputs of the representative of the entity, textual data that is predicted to correspond to the audio data capturing any spoken inputs of the representative of the entity, any conversation context data, and/or any other data described herein, to generate the output. The output can be, for example, a probability distribution over a vocabulary or sequence of terms and/or phrases. Based on the probability distribution over the vocabulary or sequence of terms and/or phrases, the processor(s) can select an instance of textual data corresponding to text and/or speech to be provided by the chatbot.

In implementations where the corresponding conversation is a text-based conversation, the processor(s) can cause the instance of the textual data to be visually rendered for presentation to the representative of the entity at the client device and/or at an additional client device of the entity. However, in implementations where the corresponding conversation is a voice-based conversation, the processor(s) can cause the chatbot to process, using text-to-speech (TTS) model(s), the instance of the textual data corresponding to generate an instance of synthesized speech audio data that captures synthesized speech corresponding to the textual data. Further, the processor(s) can cause the instance of the synthesized speech audio data to be visually rendered for presentation to the representative of the entity at the client device and/or at the additional client device of the entity. Notably, in implementations where the chatbot corresponds to the previously trained LLM that is fine-tuned based on the unstructured free-form natural language input, the chatbot is capable of generating conversational outputs that are attentioned to the task(s) to be performed based on the unstructured free-form natural language input. Further, in implementations where the chatbot corresponds to the previously trained LLM that is not fine-tuned, the chatbot is still capable of generating conversational outputs that are attentioned to the task(s) specified by the unstructured free-form natural language input since the unstructured free-form natural language input is still applied as input across the previously trained LLM that is not fine-tuned.

In various implementations, the processor(s) can cause responsive content to be provided for presentation to the user of the client device that provided the unstructured free-form natural language input. The responsive content may be determined based on one or more responses provided by the representative of the entity during the corresponding conversations. Further, the responsive content may include, for example, a corresponding result of one or more tasks determined during the corresponding conversations, a corresponding summary of the corresponding conversations, and/or other content. Continuing with the above example, the chatbot may determine whether or not the user left his or her red leather jacket at the restaurant in response to a response provided by the representative of the entity and during the corresponding conversation.

In various implementations, and during the corresponding conversations, the chatbot may utilize one or more peripheral behaviors in engaging in the corresponding conversations with the representative of the entity. These peripheral behaviors can include, for example, greetings behaviors that enable the chatbot to identify the user and/or to identify itself as a chatbot, on hold behaviors that enable the chatbot to pause and resume the corresponding conversations, bailout behaviors that enable the chatbot to terminate the corresponding conversation with the representative of the entity, and/or other peripheral behaviors These peripheral behaviors are some non-limiting examples of why the previously trained LLM enables the chatbot to perform generalized aspects of conversation and without the unstructured free-form natural language input having to specify that the chatbot is able to perform these generalized aspects of conversation. However, the fine-tuned chatbot that is fine-tuned based on the unstructured free-form natural language input enables the chatbot to perform the task(s) on behalf of the user while still being able to perform these generalized aspects of conversation.

In various implementations, the processor(s) may discard the chatbot that is generated based on the unstructured free-form natural language input in response to determining that one or more conditions are satisfied. The processor(s) may discard the chatbot based on, for example, whether the chatbot successfully performs the task(s) associated with the entity, whether the chatbot is to be utilized in performing the task(s) associated with an additional entity, whether a threshold duration of time has elapsed since the chatbot was generated, whether a threshold quantity of on-device storage of the client device is consumed by the chatbot in implementations where the chatbot is generated locally at the client device, whether a threshold quantity of on-device storage of the client device is available while the chatbot is stored in the on-device storage in implementations where the chatbot is generated locally at the client device, and/or based on other conditions. Put another way, the system can balance performance of the chatbot and how the chatbot impacts the client device in determining whether to discard the chatbot in implementations where the chatbot is generated locally at the client device.

By using the techniques described herein, various technical advantages can be achieved. As one non-limiting example, techniques described herein enable processor(s) of a client device and/or remote system to generate a chatbot based on unstructured free-form natural language input to perform task(s) specified by a user and/or utilize an existing chatbot based on unstructured free-form natural language input to perform the task(s) specified by the user. These task(s) can be specified in natural language description(s) provided by the user. This enables the process(es) to generate and deploy the chatbots in a quick and efficient manner to perform the task(s) on behalf of the user. Further, in some examples, the chatbot can be discarded subsequent to performance of the task(s) on behalf of the user. Accordingly, in implementations where the chatbot is implemented locally at a client device, techniques described herein balance current and/or future performance of the chatbot with respect to how the chatbot may impact performance of the client device. Further, in implementations where the chatbot is implemented remotely from a client device (e.g., implemented by a remote system that is communicatively coupled to the client device), the task(s) may still be performed on behalf of the user while computational resources are conserved at the client device.

The above description is provided as an overview of only some implementations disclosed herein. Those implementations, and other implementations, are described in additional detail herein.

DETAILED DESCRIPTION

Figure 1:
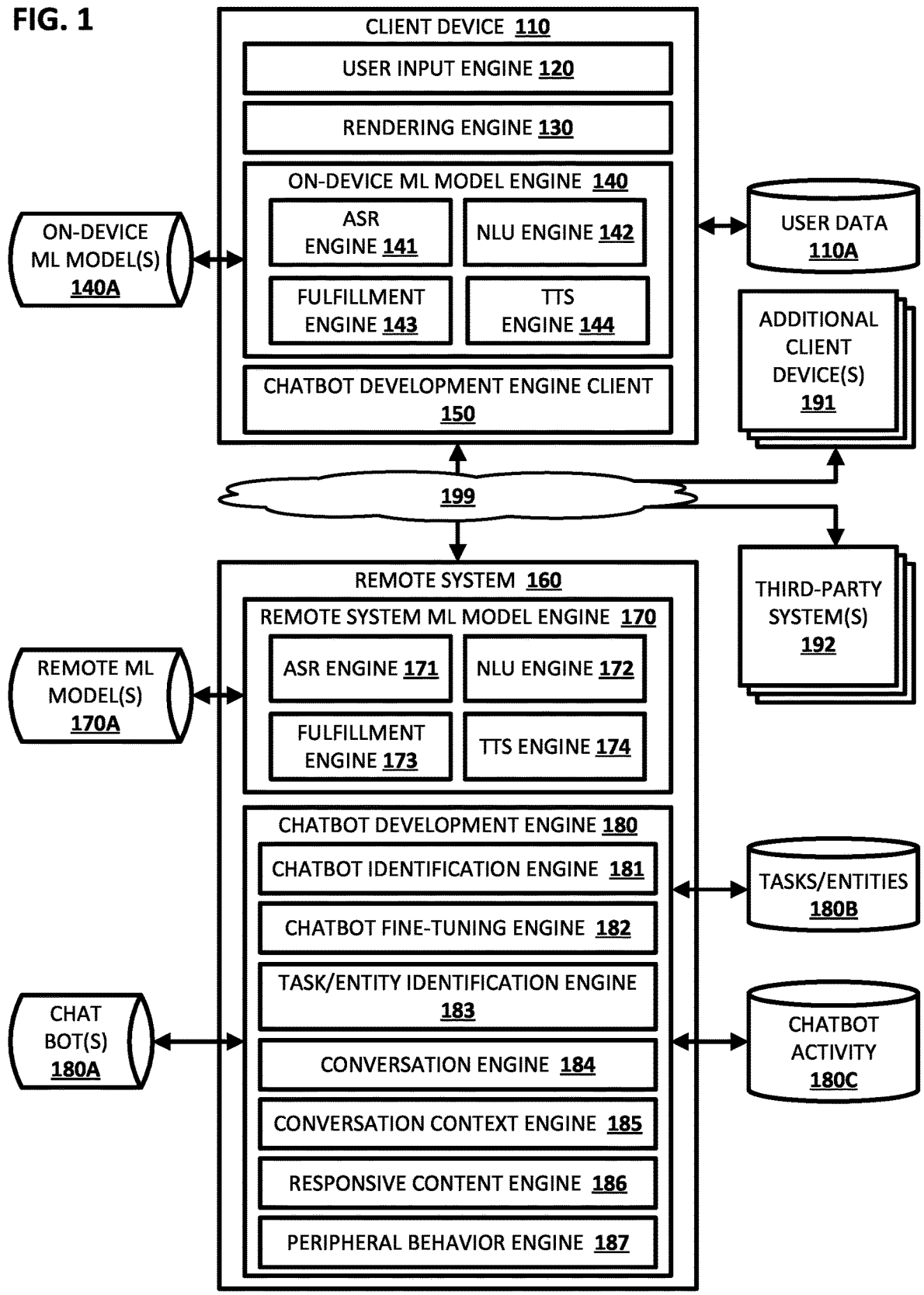
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 120, rendering engine 130, on-device machine learning (ML) model engine 140, and chatbot development engine client 150. The client device 110 can be, for example, a standalone device (e.g., having microphone(s), vision component(s), speaker(s), display(s), and/or other user interface components), a laptop, a desktop computer, a tablet, a wearable computing device, a vehicular computing device, and/or any other client device capable of implementing the chatbot development engine client 150.

The user input engine 120 can detect various types of user input at the client device 110. In some examples, the user input detected at the client device 110 can include spoken input detected via microphone(s) of the client device 110. In these examples, the microphone(s) of the client device 110 can generate audio data that captures spoken utterance(s) included in the spoken input. In other examples, the user input detected at the client device 110 can include touch input detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input. Notably, unstructured free-form natural language inputs described herein may be provided by the user of the client device 110 as any combination of spoken inputs, touch inputs, and/or typed inputs.

The rendering engine 130 can cause responsive content and/or other output to be visually rendered for presentation to the user at the client device 110 (e.g., via a touch sensitive display or other user interface output device(s)) and/or audibly rendered for presentation to the user at the client device 110 (e.g., via speaker(s) or other user interface output device(s)). The responsive content and/or other output can include, for example, various types of user interfaces associated with the chatbot development engine client 150 that may be visually rendered via a user interface of the client device 110, such as unstructured free-form natural language input provided by the user of the client device 110 that conveys details of task(s) to be performed by a chatbot and on behalf of the user of the client device, transcription(s) of corresponding conversation(s) performed by the chatbot and on behalf of the user of the client device 110, various prompts related to the corresponding conversation(s) performed by the chatbot and on behalf of the client device 110, result(s) and/or summaries of the corresponding conversation(s) performed by the chatbot and on behalf of the client device 110, and/or any other responsive content or output that be may be visually and/or audibly rendered for presentation to the user at the client device 110.

The on-device ML model engine 140 can include, in various implementations, an automatic speech recognition (ASR) engine 141, a natural language understanding (NLU) engine 142, a fulfillment engine 143, and a text-to-speech (TTS) engine 144. As described in more detail below, these on-device ML model engines of the on-device ML model engine 140 may utilize various on-device ML models (e.g., stored in on-device ML model(s) database 140A) to process various user inputs (e.g., received via the user input engine 120) and to generate various outputs (e.g., to be visually and/or audibly rendered for presentation to the user via the rendering engine 130). In turn, this enables the chatbot development engine client 150 to leverage the on-device ML model engine 140 in processing the various user inputs received at the client device 110 and in generating the various outputs to be provided for presentation to the user at the client device 110.

Further, the client device 110 is illustrated in FIG. 1 as communicatively coupled to a remote system 160 over one or more networks 199 (e.g., any combination of Wi-Fi, Bluetooth, or other local area networks (LANs); ethernet, the Internet, or other wide area networks (WANs); and/or other networks). The remote system 160 includes, in various implementations, remote system ML model engine 170 and chatbot development engine 180. The remote system 160 can be, for example, a high-performance server, a cluster of high-performance servers, and/or any other computing device that is remote from the client device 110.

The remote ML model engine 170 can include, in various implementations, an ASR engine 171, an NLU engine 172, a fulfillment engine 173, and a TTS engine 174. As described in more detail below, these remote ML model engines of the remote engine 170 may utilize various remote ML models (e.g., stored in remote ML model(s) database 170A) to process various user inputs (e.g., received via the user input engine 120) and to generate various outputs (e.g., to be visually and/or audibly rendered for presentation to the user via the rendering engine 130) in that same or similar manner as the on-device ML model engine 140 and based on data provided to the remote system 160 by the client device 110 over the one or more networks 199. In turn, this enables the chatbot development engine 180 to leverage the remote ML model engine 170 in processing the various user inputs received at the client device 110 and in generating the various outputs to be provided for presentation to the user at the client device 110. In implementations where the remote ML model engine 170 in processing the various user inputs received at the client device 110 and in generating the various outputs to be provided for presentation to the user at the client device 110, the various user inputs received at the client device 110 may be transmitted to the remote system 160 (e.g., over the one or more networks 199) and the various user outputs may be transmitted back to the client device 110 (e.g., over the one or more networks 199).

Notably, the chatbot development engine client 150 of the client device can communicate with the chatbot development engine 180 over the one or more networks 199. The chatbot development engine client 150 and the chatbot development engine 180 form, from the perspective of a user interacting with the client device 110, a logical instance of a chatbot development platform. Although the chatbot development platform is depicted in FIG. 1 as being implemented in a distributed manner over the one or more networks 199 (e.g., via utilization of the chatbot development engine client 150 and the chatbot development engine 180), it should be understood that is for the sake of example and is not meant to be limiting. For example, the chatbot development platform can alternatively be implemented exclusively at the client device 110. As another example, the chatbot development platform can alternatively be implemented exclusively at the remote system 160, but the client device 110 still be utilized to enable the user to interact with the chatbot development platform.

The chatbot development platform can be utilized by a user (e.g., the user of the client device 110) to train a chatbot as described herein to be deployed for conducting corresponding conversations on behalf of the user and/or on behalf of a third-party associated with the user (e.g., via third-party system(s) 192). Notably, the chatbot development platform can be provided by a first-party, and the user can utilize the chatbot development platform to generate the chatbot for his or herself, or for the third-party associated with the user. As used herein, the term first-party refers to an entity that publishes the chatbot development platform, whereas the term third-party refers to an entity that is distinct from the entity associated with the first-party and did not publish the chatbot development system. Accordingly, the user of the client device 110 that interacts with the chatbot development platform may also be referred to as a third-party developer.

The corresponding conversations that are described herein as being conducted by the chatbot and on behalf of the user of the client device 110 may include various types of conversations, such as voice-based conversations and text-based conversations. The voice-based conversations can include, for example, corresponding conversations conducted during automated telephone calls (e.g., Voice over Internet Protocol (VOIP), public switched telephone networks (PSTN), and/or other telephonic communication protocols) and between the client device and additional client device(s) 191, corresponding conversations in which the chatbot engages with other entities and/or users locally at a given client device (e.g., in scenarios where the client device 110 is a shared client that is accessible by multiple users), and/or in any other voice-based scenario in which the chatbot is deployed to conduct the corresponding conversations with users. The text-based conversations can include, for example, corresponding conversations conducted during text or SMS messaging, email, and/or in any other text-based scenario in which the chatbot is deployed to conduct the corresponding conversations with users.

As noted above, the chatbot development platform may leverage the on-device ML model engine 140 and/or the remote system ML model engine 170 in processing the various user inputs received at the client device 110 and in generating the various outputs to be provided for presentation to the user at the client device 110. Each of the sub-engines of the on-device ML model engine 140 and/or the remote system ML model engine 170 may be configured to perform one or more functions. Notably, the remote system ML model engine 170 includes remote based counterparts of the sub-engines of the on-device ML model engine 140. In various implementations, utilization of the on-device ML model engine 140 may be prioritized due at least in part to latency considerations, network bandwidth privacy considerations, and/or other considerations. In these implementations, the remote system ML model engine 170 may be utilized when one or more of the sub-engines of the on-device ML model engine 140 fail. In other implementations, utilization of the remote ML model engine 170 may be prioritized due at least in part to computational considerations at the client device 110, hardware considerations at the client device 110, software considerations at the client device 110, and/or other considerations. In yet other implementations, the on-device ML model engine 140 and the remote system ML model engine 170 may be utilized in conjunction with one another.

For example, the ASR engine 141 and/or 171 can process, using ASR model(s) stored in the respective ML model(s) databases (e.g., a recurrent neural network (RNN) model, a transformer model, and/or any other type of ML model capable of performing ASR), audio data that captures spoken utterances and that is generated by microphone(s) of the client device 110 to generate ASR output. Further, the NLU engine 142 and/or 172 can process, using NLU model(s) stored in the respective ML model(s) databases (e.g., a long short-term memory (LSTM), gated recurrent unit (GRU), and/or any other type of RNN or other ML model capable of performing NLU) and/or NLU rule(s), the ASR output (or other typed or touch inputs received via the user input engine 120 of the client device 110) to generate NLU output. Moreover, the fulfillment engine 143 and/or 173 can process, using fulfillment model(s) and/or fulfillment rules stored in the respective ML model(s) databases, the NLU data to generate fulfillment output. Additionally, the TTS engine 144 and/or 174 can process, using TTS model(s) stored in the respective ML model(s) databases, textual data (e.g., text formulated by a chatbot) to generate synthesized speech audio data that includes computer-generated synthesized speech.

In various implementations, the ASR output can include, for example, a plurality of speech hypotheses (e.g., term hypotheses and/or transcription hypotheses) for spoken input based on the processing of the audio data, and can optionally select a particular speech hypotheses as recognized text for the spoken input based on a corresponding value associated with each of the plurality of speech hypotheses (e.g., probability values, log likelihood values, and/or other values). In various implementations, the ASR model(s) stored in the respective ML model databases are end-to-end speech recognition model(s), such that the ASR engine 141 and/or 171 can generate the plurality of speech hypotheses directly using the model. For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms. In other implementations, the ASR model(s) are not end-to-end speech recognition model(s) such that the ASR engine 141 and/or 171 can instead generate predicted phoneme(s) (and/or other representations). For instance, the predicted phoneme(s) (and/or other representations) may then be utilized by the ASR engine 141 and/or 171 to determine a plurality of speech hypotheses that conform to the predicted phoneme(s). In doing so, the ASR engine 141 and/or 171 can optionally employ a decoding graph, a lexicon, and/or other resource(s). In various implementations, a corresponding transcription can be rendered at the client device 110 (e.g., in association with training instance input, training instance output, corresponding feature emphasis input(s), a demonstrative conversation, and/or other aspects of the chatbot development platform).

In various implementations, the NLU output can include, for example, annotated recognized text that includes one or more annotations of the recognized text for one or more (e.g., all) of the terms of the recognized text. For example, the NLU engine 142 and/or 172 may include a part of speech tagger (not depicted) configured to annotate terms with their grammatical roles. Additionally, or alternatively, the NLU engine 142 and/or 172 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 142 and/or 172 may include a coreference resolver (not depicted) configured to group, or "cluster," references to the same entity based on one or more contextual cues. For example, the coreference resolver may be utilized to resolve the term "them" to "buy theater tickets" in the natural language input "buy them", based on "theater tickets" being mentioned in a client device notification rendered immediately prior to receiving input "buy them". In some implementations, one or more components of the NLU engine 142 and/or 172 may rely on annotations from one or more other components of the NLU engine 142 and/or 172. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data (e.g., stored in user data database 110A) of the user of the client device 110 in coreference resolution and/or entity resolution. The user data may include, for example, historical location data, historical temporal data, user preference data, user account data, calendar information, email data, and/or any other user data that is accessible at the client device 110.

In various implementations, the fulfillment output can include, for example, one or more tasks to be performed by a chatbot and on behalf of the user of the client device 110. As described in more detail herein (e.g., with respect to FIGS. 2, 3, 4, 5A, 5B, 6A, and 6B), the user can provide unstructured free-form natural language input that includes one or more tasks to be performed by a chatbot and on behalf of the user of the client device 110. The one or more tasks may require the chatbot to engage in corresponding conversations with entities (or representatives of the entities). Notably, the unstructured free-form natural language input may convey details of the one or more tasks to be performed by the chatbot without any corresponding dialog state map to be utilized by the chatbot in conducting the corresponding conversations. Nonetheless, and through utilization of the chatbot development engine client 150 and/or the chatbot development engine 180, the chatbot can be generated and deployed to perform the one or more tasks in response to receiving the unstructured free-form natural language input. Accordingly, it should be understood that the fulfillment output may be based on the one or more tasks to be performed by the chatbot and may be based on responsive content determined during the corresponding conversations with the entities (or the representatives of the entities).

In various implementations, the TTS engine 144 and/or 174 can generate synthesized speech audio data that captures computer-generated synthesized speech. The synthesized speech audio data can be rendered at the client device 110 via speaker(s) of the client device 110 and/or rendered at additional client device(s) 191 via respective speaker(s) of the additional client device(s) (e.g., client devices associated with the entities and/or representatives of the entities). The synthesized speech may include any output generated by the chatbot described herein, and may include, for example, synthesized speech generated as part of a dialog between the user of the client device 110 and the chatbot, synthesized speech generated as part of a dialog between entities (or representatives of the entities) and the chatbot, and/or other synthesized speech.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 and/or the remote system 160 (e.g., over the one or more networks 199). As another example, a given client device can be utilized by multiple users in a shared setting (e.g., a group of users, a household, etc.).

The chatbot development engine 180 may include, in various implementations, chatbot identification engine 181, chatbot fine-tuning engine 182, task/entity identification engine 183, conversation engine 184, conversation context engine 185, responsive content engine 186, and peripheral behavior engine 187 as depicted in FIG. 1. Although the chatbot development engine 180 is depicted as having particular sub-engines, it should be understood that is for the sake of example and is not meant to be limiting. For example, one or more of the sub-engines depicted in FIG. 1 may be combined, while one or more other sub-engines depicted in FIG. 1 may be omitted. Further, although the chatbot development engine client 150 is not depicted as including any sub-engines, it should be understood that is for the sake of brevity and is not meant to be limiting. For example, the chatbot development engine client 150 may include the same sub-engines described with respect to the chatbot development engine 180 or a subset thereof. Additional description of the chatbot development engine 180 and its various sub-engines is provided with respect to FIG. 2.

Figure 2:
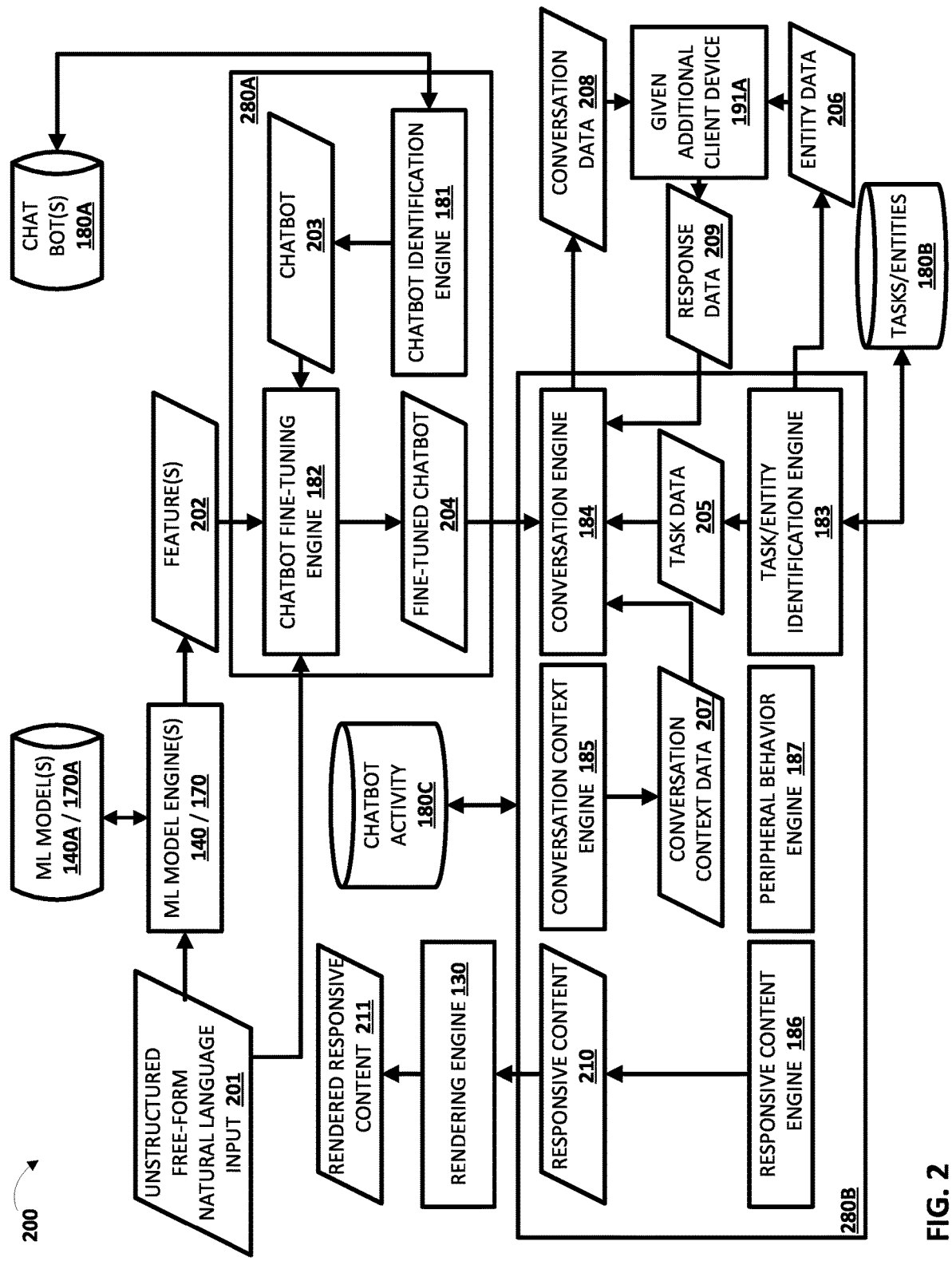
FIG. 2 depicts an example process flow for generating a chatbot and causing the chatbot to engage in a conversation with an entity, in accordance with various implementations.

Referring now to FIG. 2, an example process flow 200 for generating a chatbot and causing the chatbot to engage in a conversation with an entity is depicted. For the sake of example, assume that the user of the client device 110 from FIG. 1 provides unstructured free-form natural language input 201 as input at the client device 110. The client device 110 may receive the unstructured free-form natural language input 201 via the user input engine 120 of the client device 110. The client device 110 can cause the unstructured free-form natural language input 201 to be processed using various sub-engines of the on-device ML model engine 140 and/or using various sub-engines of the remote ML model engine 170.

Notably, in processing the unstructured free-form natural language input 201, the client device 110 can identify one or more features 202 based on output generated by one or more of the various sub-engines of the on-device ML model engine 140 and/or one or more of the various sub-engines of the remote ML model engine 170. The one or more features 202 can include, for example, ASR output in instances where the unstructured free-form natural language input 201 is spoken input, NLU output in instances where the unstructured free-form natural language input 201 is spoken input or typed input, and/or fulfillment output in instances where the unstructured free-form natural language input 201 is spoken input or typed input, such as entities, intents, slot values, task(s) associated with the entities that are to be performed by a chatbot, and/or other features.

For the sake of example, further assume that the unstructured free-form natural language input 201 is a spoken utterance of "Call Example Hotel and ask if there is a pet fee for small dogs". In this example, the ASR output may be recognized text corresponding to the spoken utterance (e.g., recognized text of "call Example Hotel and ask if there is a pet fee for small dogs"), NLU output may be a "call" intent that has a slot value of "Example Hotel" and that is associated with a task of submitting a query of "is there is a pet fee for small dogs?" to a representative of "Example Hotel". Accordingly, in some of these examples and in response to receiving the unstructured free-form natural language input 201, the client device 110 may generate a chatbot that is configured to call a telephone number associated with "Example Hotel" to submit the query of "is there is a pet fee for small dogs" to a representative of "Example Hotel" during a training phase (e.g., encompassed by box 280A in FIG. 2).

During the training phase, the chatbot identification engine 181 can identify a chatbot 203 (e.g., stored in chatbot(s) database 180A). The chatbot 203 may be a previously trained ML model or combination of various previously trained ML models that can be fine-tuned based on the unstructured free-form natural language input 201 and/or the one or more features 202 extracted from the unstructured free-form natural language input 201. For example, the chatbot 203 may correspond to a previously trained large language model (LLM), such as LaMDA, BERT, Meena, GPT-3, and/or another previously trained LLM. Notably, these previously trained LLMs have been previously trained on enormous amounts of diverse data and are typically generative ML models that are capable of engaging in corresponding conversations with users in a more natural and intuitive manner. These LLMs have a plurality of ML layers and hundreds of millions to hundreds of billions of ML parameters, and are capable of generalizing the corresponding conversations with users. For example, and as described in more detail herein (e.g., with respect to FIGS. 5A, 5B, and 6B), textual data may be provided as input across these previously trained LLMs to generate LLM output, such as a probability distribution over a vocabulary, and a response to the textual data may be generated based on the probability distribution over the vocabulary. Due to the plurality of ML layers and hundreds of millions to hundreds of billions of ML parameters, it should be noted that LLMs are typically not conducive to being implemented locally at the client device 110, such as when the chatbot(s) database 180A is local to the client device 110 (e.g., stored in on-device storage of the client device 110). Nonetheless, various sparsification techniques may be utilized to reduce the amount of ML layers and/or the amount of ML parameters utilized by these LLMs such that a sparsified version a previously trained LLM may be implemented locally at the client device 110 while mitigating reduction in precision and/or recall of the previously trained LLM due to the sparsification. These sparsification techniques may include, but are not limited to, collapsing and/or combining multiple layers of the plurality of ML layers of the previously trained LLM, pruning multiple layers of the plurality of ML layers of the previously trained LLM, masking weights of the previously trained LLM, pruning weights of the previously trained LLM, and/or other sparsification techniques. However, when the chatbot(s) database 180A is remote from the client device 110 (e.g., stored in remote storage of the remote system 160), an unsparsified version of a previously trained LLM may be implemented remotely at the remote system 160. Accordingly, the chatbot 203 may be identified locally at the client device 110 and/or remotely at the remote system 160 (e.g., remote from the client device 110 that received the unstructured free-form natural language input 201).

Further, during the training phase, the chatbot fine-tuning engine 182 may utilize various fine-tuning techniques to generate a fine-tuned chatbot 204 by fine-tuning the chatbot 203 and based on the unstructured free-form natural language input 201 and/or the one or more features 202 extracted from the unstructured free-form natural language input 201 (and the fine-tuned chatbot 204 may optionally be stored in the chatbot(s) database 180A). These fine-tuning techniques may include, but are not limited to, instruction tuning, few-shot learning, and/or other fine-tuning techniques, and the fine-tuning performed may vary based on the unstructured free-form natural language input 201 provided by the user. Put another way, the previously trained LLM that corresponds to the chatbot 203 may be further trained based on the unstructured free-form natural language input 201 and/or the one or more features 202 extracted from the unstructured free-form natural language input 201, such that the previously trained LLM that is fine-tuned and corresponds to the fine-tuned chatbot 204 is adapted to perform task(s) on behalf of the user. By fine-tuning the chatbot 203, the resulting fine-tuned chatbot 204 leverages the generalization capabilities of the previously trained LLM while also being adapted to perform the task(s) that are associated with the entity and on behalf of the user. Accordingly, the chatbot 203 may be fine-tuned to generate the fine-tuned chatbot 204 locally at the client device 110 and/or remotely at the remote system 160 (e.g., remote from the client device 110 that received the unstructured free-form natural language input 201). The fine-tuned chatbot 204 may be subsequently utilized during an inference phase (e.g., encompassed by box 280B in FIG. 2).

Although FIG. 2 is described with respect to fine-tuning the chatbot 203 based on the unstructured free-form natural language input 201 and/or the one or more features 202 of the unstructured free-form natural language input 201 to generate the fine-tuned chatbot 204, it should be understood that is only one implementation contemplated herein. For example, in other implementations, the chatbot 203 may not be fine-tuned such that the chatbot 203 may be subsequently utilized by the client device 110 and/or the remote system 160 during an inference phase (e.g., encompassed by box 280B in FIG. 2).

During the inference phase, the task/entity identification engine 183 may determine task data 205 and entity data 206 to be utilized by the chatbot in performing the task(s) during the corresponding conversation. Continuing with the above example where the unstructured free-form natural language input 201 is the spoken utterance of "Call Example Hotel and ask if there is a pet fee for small dogs", the task data 205 may include, for instance, the task of submitting the query of "is there is a pet fee for small dogs" to the representative of "Example Hotel". Further, the entity data 206 may include a corresponding identifier for "Example Hotel", such as a telephone number to initiate the call with the representative of "Example Hotel". In various implementations, information about tasks and/or entities may be stored in tasks/entities database 180B and/or other data sources that are accessible by the client device 110. Although the task data 205 and the entity data 206 are described as including particular data, it should be understood that is for the sake of example and is not meant to be limiting. For instance, the task data 205 may include any data related to any task that may be specified by the user of the client device 110 in the unstructured free-form natural language input 201. Further, the entity data 106 may include an indication of any entity and/or any corresponding identifiers for the entity. Moreover, although the task data 205 in the above example only includes a single task and the entity data 206 only identifies a single entity, it should be understood that is for the sake of example and is not meant to be limiting. For instance, the task data 205 may include any data for multiple tasks that may be specified by the user of the client device 110 in the unstructured free-form natural language input 201. Further, the entity data 206 may identify multiple entities belonging to a particular type of entity (e.g., if the unstructured free-form natural language input 201 instead corresponded to spoken utterance of "Call hotels around me and ask if there is a pet fee for small dogs", where "hotels" is a particular type of entity and specific hotels that are locationally proximate to the user may be identified).

Notably, the task/entity identification engine 183 may utilize the entity data 206 to initiate the corresponding conversation with the representative of the entity (e.g., by calling the telephone phone number associated with "Example Hotel" to place an outgoing telephone call to a given additional client device 191A via the chatbot 203 or the fine-tuned chatbot 204), and may provide the task data 205 to the conversation engine 184 to enable the chatbot 203 or the fine-tuned chatbot 204 to engage in a corresponding conversation with the representative of the entity. In various implementations, the conversation context engine 185 may provide conversation context data 207 to the conversation engine 184 and in addition to enable the chatbot 203 or the fine-tuned chatbot 204 to engage in a more contextualized corresponding conversation with the representative of the entity task data 205. In these implementations, the conversation context data 207 may represent (e.g., as a vector or other data structure) initial contextual information for the corresponding conversation or subsequent contextual information that is determined during the corresponding conversation (e.g., determined based on data stored in chatbot activity database 180C).

Continuing with the above example where the unstructured free-form natural language input 201 is the spoken utterance of "Call Example Hotel and ask if there is a pet fee for small dogs", the conversation context engine 185 may generate conversation context data 207 that indicates "[user] intends on staying at Example Hotel", information associated with the intended stay of the user of the client device 110 (e.g., check-in or check-out day/time from an email account of the user of the client device 110, an "Example Hotel" loyalty rewards number from an email account of the user of the client device 110 or an "Example Hotel" software application that is accessible at the client device 110, etc.), "[user] would like to bring his or her small dog", and/or other contextual information that may be inferred based on the unstructured free-form natural language input 201 and/or other data that is accessible at the client device 110 (e.g., via the user data database 110A).

Further, during the inference phase and subsequent to initiating the corresponding (e.g., using the entity data 206), and in implementations where the chatbot corresponds to the fine-tuned chatbot 204, the conversation engine 184 can initially process, using the fine-tuned chatbot 204, the task data 205 (and optionally the conversation context data 207) to generate output, such as a probability distribution over a sequence of words or phrases. The conversation engine 184 can generate conversation data 208 based on the output generated using the fine-tuned chatbot 204. The conversation data 208 can include, for example, one or more instances of synthesized speech audio data in implementations where the corresponding conversation is a voice-based conversation, one or more instances of textual data in implementations where the corresponding conversation is a text-based conversation. In various implementations, and as depicted in FIG. 2, the conversation data 208 can be transmitted to the given additional client device 191A to cause the conversation data 208 to be rendered audibly and/or visually at the given additional client device 191A. However, in other implementations, such as when the fine-tuned chatbot 204 engages in the corresponding conversation locally at the client device 110 (e.g., when the client device 110 is deployed in a shared setting), the conversation data 208 may be rendered audibly and/or visually at the client device 110.

Alternatively, during the inference phase and in implementations where the chatbot corresponds to the chatbot 203 (e.g., and not the fine-tuned chatbot 204), the conversation engine 184 can initially process, using the chatbot 203, the unstructured free-form natural language input 201, the one or more features 202 determined based on processing the unstructured free-form natural language input 201, the task data 205 (and optionally any other data described herein) to generate output, such as a probability distribution over a sequence of words or phrases. The conversation engine 184 can generate conversation data 208 based on the output generated using the chatbot 203. The conversation data 208 can include, for example, the instance(s) of synthesized speech audio data in implementations where the corresponding conversation is a voice-based conversation, the instance (s) of textual data in implementations where the corresponding conversation is a text-based conversation. In various implementations, and as depicted in FIG. 2, the conversation data 208 can be transmitted to the given additional client device 191A to cause the conversation data 208 to be rendered audibly and/or visually at the given additional client device 191A. However, in other implementations, such as when the chatbot 203 engages in the corresponding conversation locally at the client device 110 (e.g., when the client device 110 is deployed in a shared setting), the conversation data 208 may be rendered audibly and/or visually at the client device 110. Put another way, rather than fine-tuning the chatbot 203 during the training phase, the chatbot 203 can be primed during the inference phase based on the unstructured free-form natural language input 201 and/or the one or more features 202 determined based on processing the unstructured free-form natural language input 201. This enables the client device 110 and/or the remote system 160 to conserve computational resources while still effectively deploying the chatbot to engage in the corresponding conversations.

Continuing with the above example where the unstructured free-form natural language input 201 is the spoken utterance of "Call Example Hotel and ask if there is a pet fee for small dogs", the conversation data 208 may include synthesized speech audio data that is to be audibly rendered at the given additional client device 191A and that includes synthesized speech of "Hi, this is a chatbot calling on behalf of [user], is there is a pet fee for small dogs?". Notably, the synthesized speech includes the query of "is there a pet fee for small dogs?" and solicits a response from the representative of the entity that answers the phone call initiated by the chatbot 203 or the fine-tuned chatbot 204. Accordingly, response data 209 may include a response to the query that was included in the synthesized speech. The response data 209 may include audio data that is provided by the representative of the entity. In these implementations, responsive content engine 186 can utilize the ML model engine(s) 140 and/or 170 to process, using various ML model(s), to determine whether the response data 209 includes a response that indicates the task has been successfully performed.

For instance, further assume that the response data 209 includes audio data capturing a spoken utterance of "yes, our pet fee for small dogs is $25 per night" from the representative of the entity. In this instance, the responsive content engine 186 can cause the audio data provided by the representative of the entity to be processed (e.g., input parsing using ASR model(s), NLU model(s), and/or fulfillment rules) to determine that the representative of the entity provided a response that is responsive to the query. Put another way, the responsive content engine 186 can determine responsive content 210 that was provided by the representative of the entity and that is responsive to the query that corresponds to the task in this example (e.g., that the pet fee for small dogs is $25 per night). Further, the responsive content engine 186 can provide the responsive content 210 to the rendering engine 130 to cause the client device to audibly and/or visually provide rendered responsive content 211 for presentation to the user. Accordingly, implementations described herein enable the user to provide the unstructured free-form natural language input 201 to cause the fine-tuned bot 204 to be generated and utilized in performance of the task(s) included in the unstructured free-form natural language input 201.

As described in more detail herein (e.g., with respect to FIGS. 5A, 5B, and 6B), the chatbot 203 and the fine-tuned chatbot 204 may have various peripheral behaviors that may be implemented by the chatbot 203 and the fine-tuned chatbot 204 through utilization of the peripheral behavior engine 187. These peripheral behaviors can include, but are not limited to, greetings behaviors that enable the chatbot 203 and the fine-tuned chatbot 204 to identify the user of the client device 110 and/or to identify itself as a chatbot, remote procedure call (RPC) behaviors that enable the chatbot 203 and the fine-tuned chatbot 204 to search one or more databases during the corresponding conversations, on hold behaviors that enable the chatbot 203 and the fine-tuned chatbot 204 to pause and resume the corresponding conversations, bailout behaviors that enable the chatbot 203 and the fine-tuned chatbot 204 to prompt the user of the client device 110 to join the corresponding conversation when requested by the representative of the entity and/or otherwise terminate the corresponding conversation, clarification behaviors that enable the chatbot 203 and the fine-tuned chatbot 204 to clarify and/or repeat information that was previously provided during the corresponding conversations, and/or other peripheral behaviors that may invoked by the chatbot 203 and the fine-tuned chatbot 204 when corresponding conditions for invoking those other peripheral behaviors.

Although FIG. 2 is described with respect to the corresponding conversation being a phone call between the chatbot 203 or the fine-tuned chatbot 204 (e.g., being implemented locally at the client device 110 and/or remotely at the remote system 160) and the representative of the entity (e.g., being accessible at the given additional client device 191A), it should be understood that is not meant to be limiting. Rather, it should be understood that the techniques described herein may be utilized to fine-tune a chatbot that can be deployed for engaging in voice-based conversations and text-based conversations that are conducted across multiple computing devices and/or at a single computing device.

Figure 3:
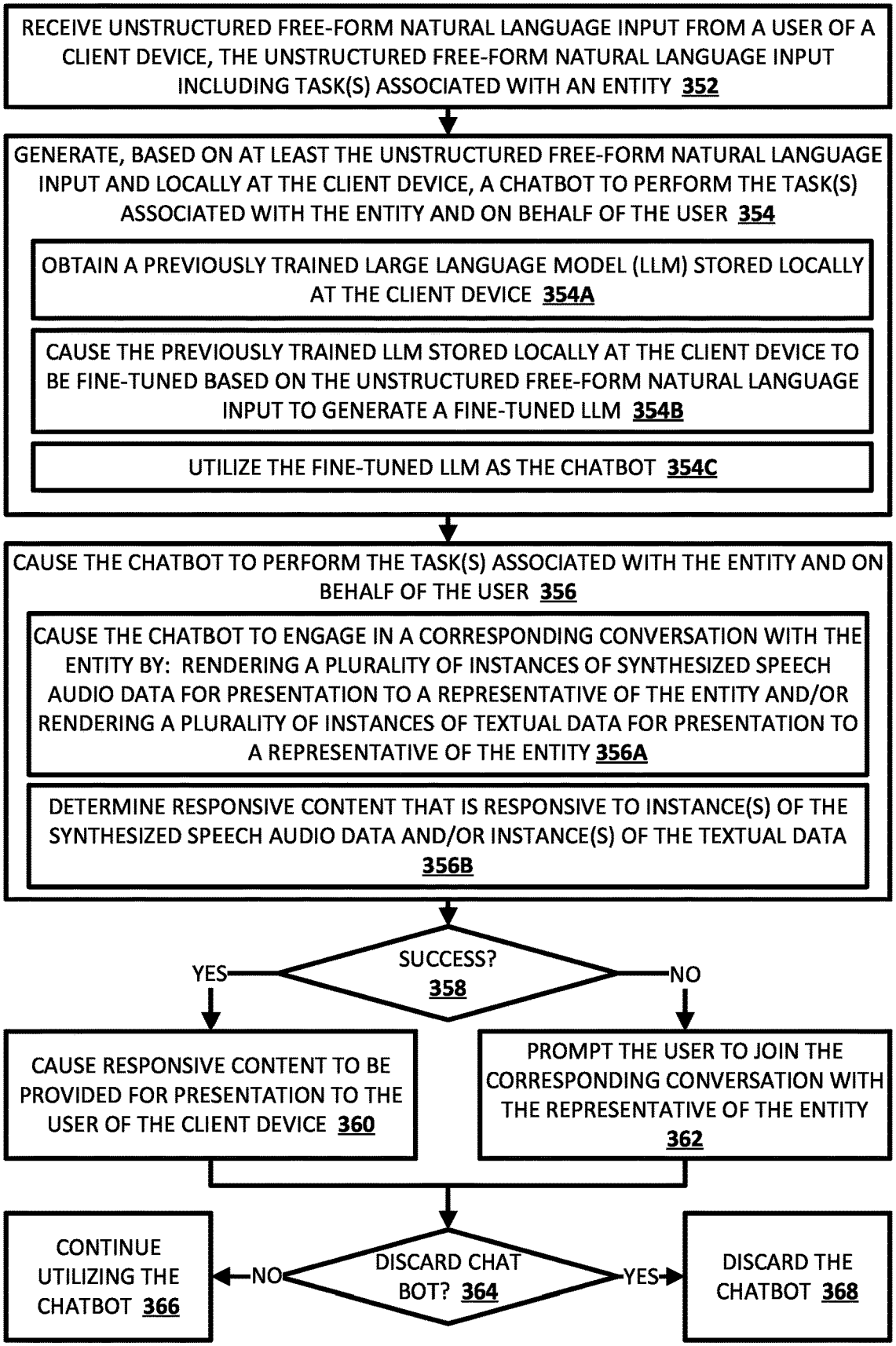
FIG. 3 depicts a flowchart illustrating an example method of generating a chatbot locally at a client device and causing the chatbot to engage in a conversation with an entity, in accordance with various implementations.

Turning now to FIG. 3, a flowchart illustrating an example method 300 of generating a chatbot locally at a client device and causing the chatbot to engage in a conversation with an entity is depicted. For convenience, the operations of the method 300 are described with reference to a system that performs the operations. This system of the method 300 includes at least one processor, memory, and/or other component(s) of client device(s) (e.g., client device 110 of FIG. 1, computing device 710 of FIG. 7, and/or other client devices). Moreover, while operations of the method 300 are shown in a particular order, this is not meant to be limiting. One or more operations may be reordered, omitted, and/or added.

At block 352, the system receives unstructured free-form natural language input from a user of a client device, the unstructured free-form natural language input including one or more tasks associated with an entity. The unstructured free-form natural language input received from the user of the client device may include, for example, spoken input received via microphone(s) of the client device, typed input received via a touch sensitive display of the client device, and/or touch input received view the touch sensitive display of the client device. Further, the unstructured free-form natural language input may convey details of the one or more tasks to be performed by a chatbot and on behalf of the user of the client device. Notably, the unstructured free-form natural language input is unstructured in the sense that the user need not provide the free-form natural language input according to any schema or particular manner.

At block 354, the system generates, based on at least the unstructured free-form natural language input and locally at the client device, a chatbot to perform the one or more tasks associated with the entity and on behalf of the user. In some implementations, and as indicated at block 354A, the system obtains a previously trained large language model (LLM) stored locally at the client device. Further, in these implementations, and as indicated at block 354B, the system causes the previously trained LLM stored locally at the client device to be fine-tuned based on the unstructured free-form natural language input to generate a fine-tuned LLM. Moreover, in these implementations, and as indicated at block 354C, the system utilizes the fine-tuned LLM as the chatbot. The system can generate the chatbot to perform the one or more tasks associated with the entity and on behalf of the use in the same or similar described above with respect to FIG. 2 (e.g., in implementations where the training phase is implemented locally at the client device and described with respect to the box 280A). Notably, in these implementations, the system is being implemented at locally at the client device, and, as a result, the previously trained LLM may be a sparsified version of a previously trained LLM that may otherwise be available (e.g., otherwise available to a remote system) due to various hardware and/or software constraints of the client device.

At block 356, the system causes the chatbot to perform the one or more tasks associated with the entity and on behalf of the user. In some implementations, and as indicated at block 356A, the system causes the chatbot to engage in a corresponding conversation with the entity by: rendering a plurality of instances of synthesized speech audio data for presentation to a representative associated with the entity and/or rendering a plurality of instances of textual data for presentation to a representative of the entity. Further, in these implementations, and as indicated at block 356B, the system determines responsive content that is responsive to one or more of the instances of synthesized speech audio data and/or one or more of the instances of the textual data. The system can cause the chatbot to perform the one or more tasks associated with the entity and on behalf of the user in the same or similar described above with respect to FIG. 2 (e.g., in implementations where the inference phase is implemented locally at the client device and described with respect to the box 280B) and with respect to FIGS. 5A, 5C, and 6B.

At block 358, the system determines whether the chatbot successfully performed the one or more tasks associated with the entity. The system may determine whether the chatbot successfully performed the one or more tasks associated with the entity based on, for example, responsive content that is responsive to one or more of the instances of synthesized speech audio data and/or one or more of the instances of the textual data. Various non-limiting examples of determining whether the chatbot successfully performed the one or more tasks associated with the entity are described herein (e.g., with respect to FIGS. 5A, 5B, and 5C).

If, at an iteration of block 358, the system determines that the chatbot has successfully performed the one or more tasks associated with the entity, then the system may proceed to block 360. At block 360, the system causes responsive content to be provided for presentation to the user of the client device. The responsive content may be determined based on, for example, one or more responses provided by the representative of the entity during the corresponding conversation. The system proceeds to block 364. Block 364 is described in more detail below.

If at an iteration of block 358, the system determines that the chatbot has not successfully performed the one or more tasks associated with the entity, then the system may proceed to block 362. At block 362, the system prompts the user to join the corresponding conversation with the representative of the entity. Put another way, if the chatbot does not successfully perform the one or more tasks associated with the entity, then the chatbot may prompt the user to join the corresponding conversation to ensure that the one or more tasks are still performed. The system proceeds to block 364.

At block 364, the system determines whether to discard the chatbot. The system may determine whether to discard the chatbot, for example, based on whether the chatbot successfully performs the one or more tasks associated with the entity, whether the chatbot is to be utilized in performing the one or more tasks associated with an additional entity, whether a threshold duration of time has elapsed since the chatbot was generated, whether a threshold quantity of on-device storage of the client device is consumed by the chatbot, whether a threshold quantity of on-device storage of the client device is available while the chatbot is stored in the on-device storage, and/or based on other conditions. Put another way, the system can balance performance of the chatbot and how the chatbot impacts the client device in determining whether to discard the chatbot.

If, at an iteration of block 364, the system determines not to discard the chatbot, then the system may proceed to block 366. At block 366, the system continues utilizing the chatbot. For example, the system may continue utilizing the chatbot if the one or more tasks associated with the entity were not successfully performed but that the one or more tasks may be successfully performed with respect to additional entities. For instance, if the unstructured free-form natural language input corresponds to a spoken utterance of "find me a local plumber that is available as soon as possible", but the responsive content determined based on calling a first local plumber indicates that the first local plumber is not available, then the system may continue to utilize the chatbot to call a second local plumber. In this instance, the system may call the first local plumber and the second local plumber in a serial or parallel manner.

If, at an iteration of block 364, the system determines to discard the chatbot, then the system may proceed to block 368. At block 368, the system discards the chatbot. For example, the system may discard the chatbot in response to determining that the one or more tasks associated with the entity was successfully performed, and optionally in response to determining that there are no additional entities with which to engage in corresponding conversations. As another example, the system may discard the chatbot if the chatbot consumes more than a threshold quantity of memory resources at the client device or if the chatbot causes less than a threshold quantity of memory resources to be available at the client device.

The system may perform another iteration of the method 300 based on additional unstructured free-form natural language input received by the system. Although FIG. 3 is described with respect to the system being implemented locally at the client device of the user, it should be understood that is for the sake of example, and is not meant to be limiting. For example, and as described below with respect to FIG. 4, the system may be implemented by a remote system that is remote from the client device of the user who provided the unstructured free-form natural language input.

Further, although the method 300 of FIG. 3 is described with respect to the chatbot being a previously trained LLM that is fine-tuned based on the unstructured free-form natural language input (e.g., at block 354), it should be understood that is for the sake of example and is not meant to be limiting. In additional or alternative implementations, the previously trained LLM may be utilized as the chatbot without any fine-tuning. In these implementations, and in causing the chatbot to engage in the given corresponding conversation with the given additional users (e.g., at block 356), the system can prime the previously trained LLM based on the unstructured free-form natural language input. This enables the chatbot to engage in the corresponding conversation without any explicit fine-tuning during a training phase.

Figure 4:
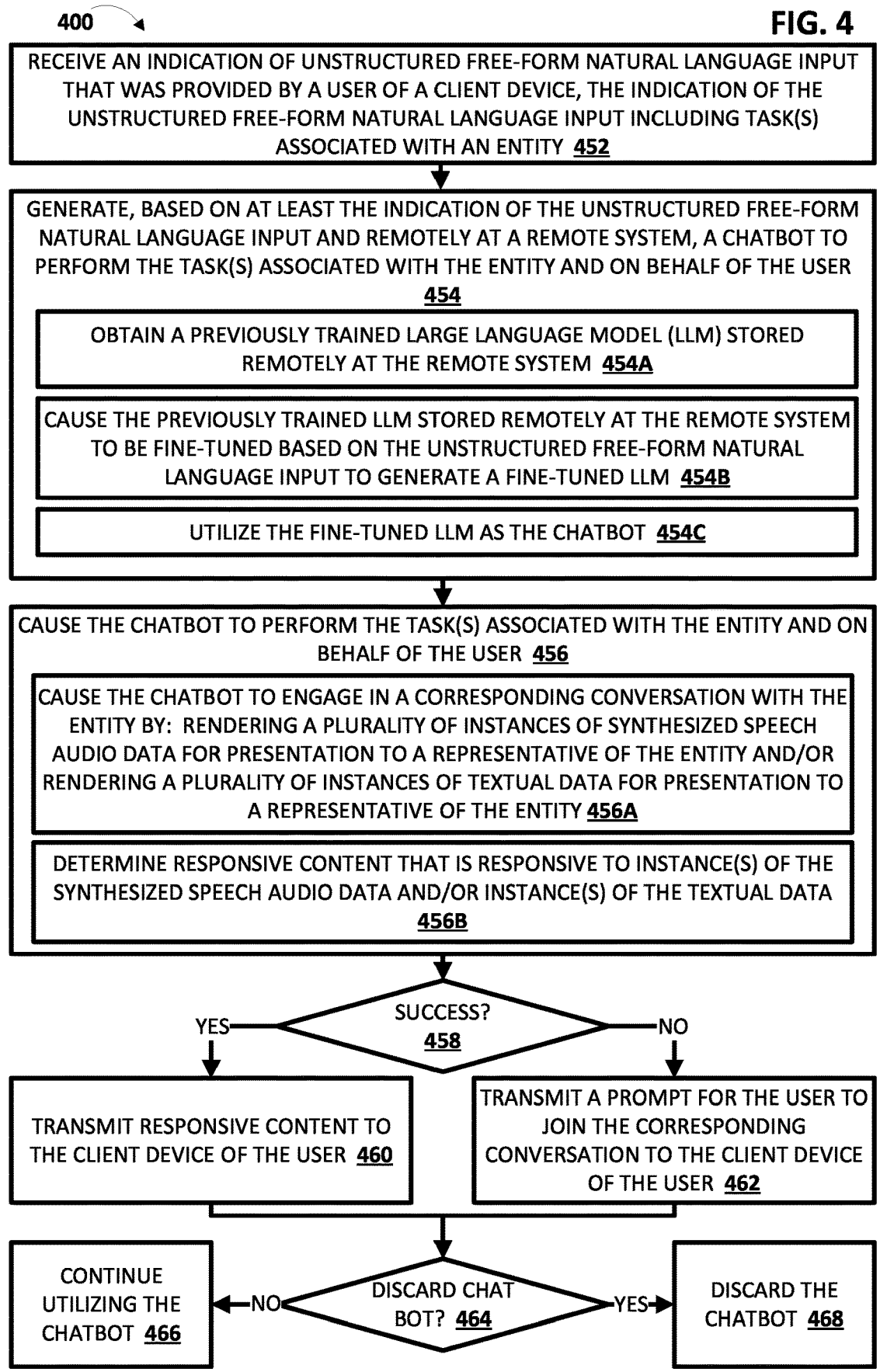
FIG. 4 depicts a flowchart illustrating an example method of generating a chatbot remotely at a remote system and causing the chatbot to engage in a conversation with an entity, in accordance with various implementations.

Turning now to FIG. 4, a flowchart illustrating an example method 400 of generating a chatbot remotely at a remote system and causing the chatbot to engage in a conversation with an entity is depicted. For convenience, the operations of the method 400 are described with reference to a system that performs the operations. This system of the method 400 includes at least one processor, memory, and/or other component(s) of remote system(s) (e.g., remote system 160 of FIG. 1, computing device 710 of FIG. 7, and/or other remote systems). Moreover, while operations of the method 400 are shown in a particular order, this is not meant to be limiting. One or more operations may be reordered, omitted, and/or added.

At block 452, the system receives an indication of unstructured free-form natural language input that was provided by a user of a client device, the indication of the unstructured free-form natural language input including one or more tasks associated with an entity. The unstructured free-form natural language input received from the user of the client device may include, for example, spoken input received via microphone(s) of the client device, typed input received via a touch sensitive display of the client device, and/or touch input received view the touch sensitive display of the client device. Further, the unstructured free-form natural language input may convey details of the one or more tasks to be performed by a chatbot and on behalf of the user of the client device. Moreover, the indication of the unstructured free-form natural language input may be transmitted to the system over one or more networks. Notably, the unstructured free-form natural language input is unstructured in the sense that the user need not provide the free-form natural language input according to any schema or particular manner.

At block 454, the system generates, based on at least the indication of the unstructured free-form natural language input and remotely at a remote system, a chatbot to perform the one or more tasks associated with the entity and on behalf of the user. In some implementations, and as indicated at block 454A, the system obtains a previously trained large language model (LLM) stored remotely at the remote system. Further, in these implementations, and as indicated at block 454B, the system causes the previously trained LLM stored remotely at the remote system to be fine-tuned based on the unstructured free-form natural language input to generate a fine-tuned LLM. Moreover, in these implementations, and as indicated at block 454C, the system utilizes the fine-tuned LLM as the chatbot. The system can generate the chatbot to perform the one or more tasks associated with the entity and on behalf of the use in the same or similar described above with respect to FIG. 2 (e.g., in implementations where the training phase is implemented remotely at the remote system and described with respect to the box 280A). Notably, in these implementations, the system is being implemented remotely from the client device and at the remote system, and, as a result, the previously trained LLM may be an unsparsified version of a previously trained LLM that is more robust than a sparsified version of the previously trained LLM due to virtually no hardware and/or software constraints at the remote system.

At block 456, the system causes the chatbot to perform the one or more tasks associated with the entity and on behalf of the user. In some implementations, and as indicated at block 456A, the system causes the chatbot to engage in a corresponding conversation with the entity by: rendering a plurality of instances of synthesized speech audio data for presentation to a representative associated with the entity and/or rendering a plurality of instances of textual data for presentation to a representative of the entity. Further, in these implementations, and as indicated at block 456B, the system determines responsive content that is responsive to one or more of the instances of synthesized speech audio data and/or one or more of the instances of the textual data. The system can cause the chatbot to perform the one or more tasks associated with the entity and on behalf of the user in the same or similar described above with respect to FIG. 2 (e.g., in implementations where the inference phase is implemented remotely at the remote system and described with respect to the box 280B) and with respect to FIGS. 5A, 5C, and 6B. Notably, in these implementations, and in engaging in the corresponding conversation, the system can communicate directly with an additional client device of the representative of the entity and without interacting with the client device during the corresponding conversation in some instances.

At block 458, the system determines whether the chatbot successfully performed the one or more tasks associated with the entity. The system may determine whether the chatbot successfully performed the one or more tasks associated with the entity based on, for example, responsive content that is responsive to one or more of the instances of synthesized speech audio data and/or one or more of the instances of the textual data. Various non-limiting examples of determining whether the chatbot successfully performed the one or more tasks associated with the entity are described herein (e.g., with respect to FIGS. 5A, 5B, and 5C).

If, at an iteration of block 458, the system determines that the chatbot has successfully performed the one or more tasks associated with the entity, then the system may proceed to block 460. The responsive content may be determined based on, for example, one or more responses provided by the representative of the entity during the corresponding conversation. At block 460, the system transmits responsive content to the client device of the user. Transmitting the responsive content to the client device of the user causes the responsive content to be provided for presentation to the user of the client device. The system proceeds to block 464. Block 464 is described in more detail below.

If at an iteration of block 458, the system determines that the chatbot has not successfully performed the one or more tasks associated with the entity, then the system may proceed to block 462. Put another way, if the chatbot does not successfully perform the one or more tasks associated with the entity, then the chatbot may prompt the user to join the corresponding conversation to ensure that the one or more tasks are still performed. At block 462, the system transmits a prompt for the user to join the corresponding conversation to the client device of the user. Transmitting the prompt to the client device of the user causes the prompt to be provided for presentation to the user of the client device. The system proceeds to block 464.

At block 464, the system determines whether to discard the chatbot. The system may determine whether to discard the chatbot, for example, based on whether the chatbot successfully performs the one or more tasks associated with the entity, whether the chatbot is to be utilized in performing the one or more tasks associated with an additional entity, whether a threshold duration of time has elapsed since the chatbot was generated, and/or based on other conditions. Notably, in these implementations, the system may not have to balance performance of the chatbot and how the chatbot impacts the client device in determining whether to discard the chatbot since the chatbot may not be generated and/or implemented locally at the client device of the user.

If, at an iteration of block 464, the system determines not to discard the chatbot, then the system may proceed to block 466. At block 466, the system continues utilizing the chatbot. For example, the system may continue utilizing the chatbot if the one or more tasks associated with the entity were not successfully performed but that the one or more tasks may be successfully performed with respect to additional entities (e.g., as described with respect to block 364 of FIG. 3). If, at an iteration of block 464, the system determines to discard the chatbot, then the system may proceed to block 468. At block 468, the system discards the chatbot. For example, the system may discard the chatbot in response to determining that the one or more tasks associated with the entity was successfully performed, and optionally in response to determining that there are no additional entities with which to engage in corresponding conversations.

The system may perform another iteration of the method 400 based on an additional indication of additional unstructured free-form natural language input received by the system. Although FIG. 4 is described with respect to the system being implemented remotely from the client device of the user and at a remote system, it should be understood that is for the sake of example, and is not meant to be limiting. For example, and as described above with respect to FIG. 3, the system may be implemented at the client device of the user who provided the unstructured free-form natural language input. As another example, the system may be implemented at both the client device and the remote system in a distributed manner. For instance, the chatbot may be generated locally at the client device, but implemented at the remote system such that computational resources of the client device are not utilized in causing the chatbot to engage in the corresponding conversation. Also, for instance, the chatbot may be generated at the remote system, but implemented at the client device such that computational resources of the client device are only utilized in causing the chatbot to engage in the corresponding conversation.

Further, although the method 400 of FIG. 4 is also described with respect to the chatbot being a previously trained LLM that is fine-tuned based on the unstructured free-form natural language input (e.g., at block 454), it should be understood that is for the sake of example and is not meant to be limiting. In additional or alternative implementations, the previously trained LLM may be utilized as the chatbot without any fine-tuning. In these implementations, and in causing the chatbot to engage in the given corresponding conversation with the given additional users (e.g., at block 456), the system can prime the previously trained LLM based on the unstructured free-form natural language input. This enables the chatbot to engage in the corresponding conversation without any explicit fine-tuning during a training phase.

Figure 5A:
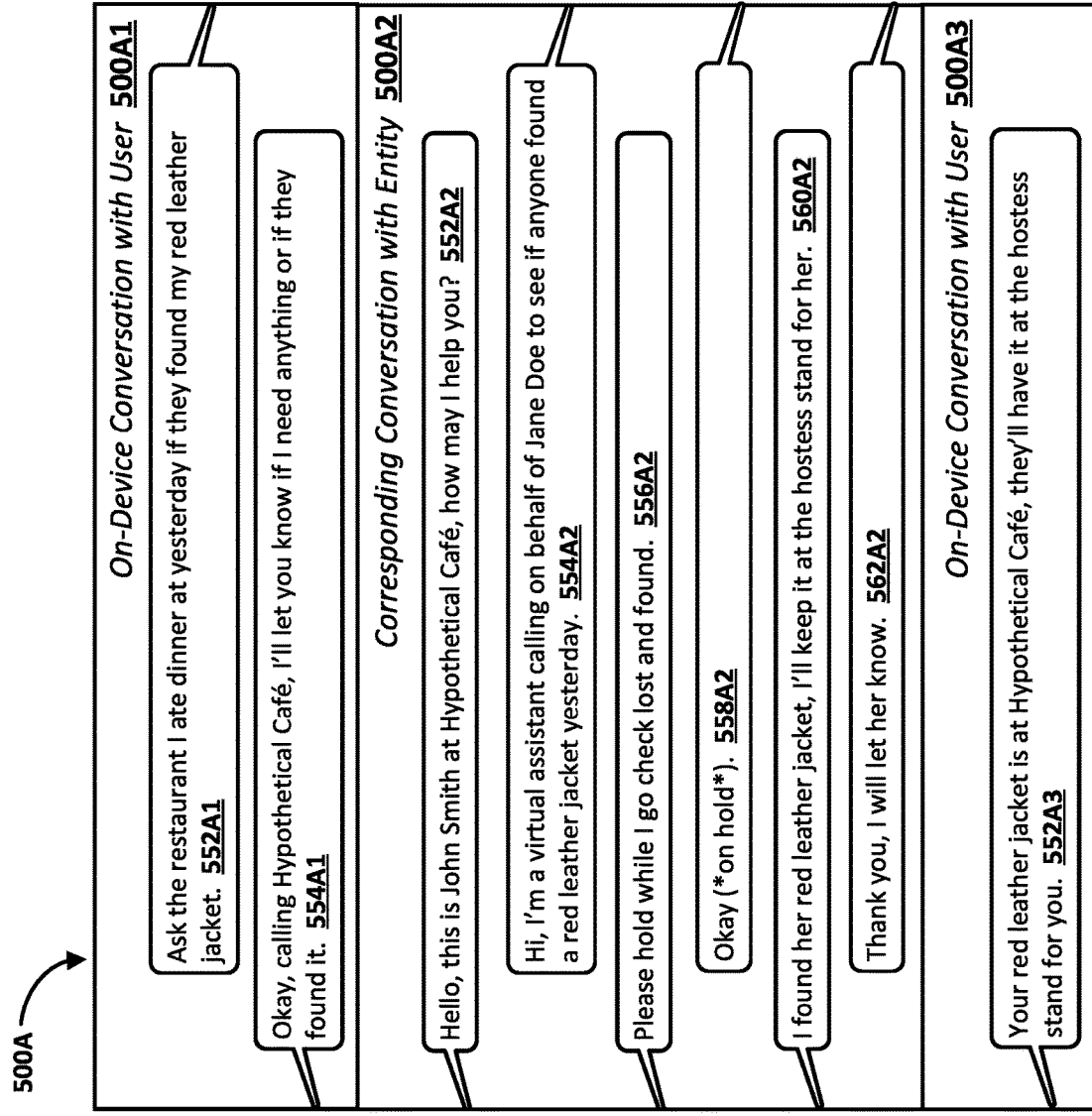
FIG. 5A and FIG. 5B depict various non-limiting example interactions of corresponding unstructured free-form natural language input being utilized to generate a corresponding chatbot, and the corresponding chatbot performing corresponding task(s) based on the corresponding unstructured free-form natural language input, in accordance with various implementations.
Figure 5B:
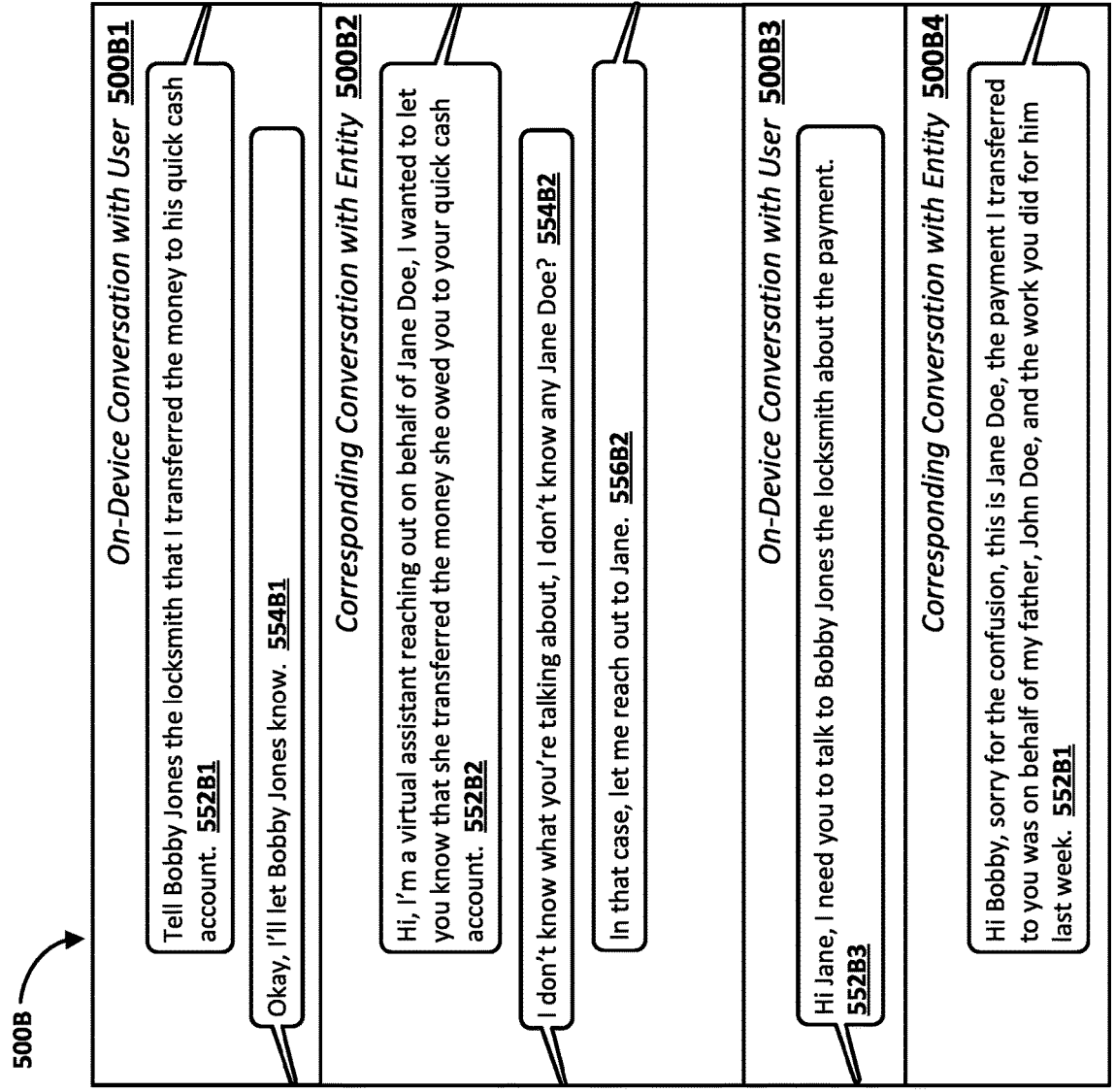

Turning now to FIGS. 5A and 5B, various non-limiting example interactions of corresponding unstructured free-form natural language input being utilized to generate a corresponding chatbot, and the corresponding chatbot performing corresponding task(s) based on the corresponding unstructured free-form natural language input are depicted. Notably, interactions 500A and 500B described with respect to FIGS. 5A and 5B, respectively, may be implemented across multiple computing devices to cause the chatbot to perform the corresponding task(s) to be performed. For example, the corresponding unstructured free-form natural language input described with respect to the examples of FIGS. 5A and 5B may be received at a client device of a user (e.g., the client device 110 of FIG. 1), the chatbot described with respect to the examples of FIGS. 5A and 5B may be generated at the client device of the user (e.g., the client device 110 of FIG. 1) and/or at a remote system (e.g., the remote system 160 from FIG. 1), the chatbot described with respect to the examples of FIGS. 5A and 5B may be implemented at the client device of the user (e.g., the client device 110 of FIG. 1) and/or at a remote system (e.g., the remote system 160 from FIG. 1) and communicate with a representative of an entity via an additional computing device of the representative. Each of these computing devices may include respective components, such as user interface input components (e.g., microphone(s), vision component(s), presence sensor(s), touch sensitive display(s), keyboard(s), hardware button(s), software button(s), etc.), user interface output components (e.g., touch sensitive display(s), speaker(s), monitor(s), projector(s), etc.), network interface(s), and/or other components. Accordingly, although interactions 500A and 500B of FIGS. 5A and 5B are depicted within a single interface, respectively, it should be understood that is for the sake of illustrating various techniques described herein and is not meant to be limiting.

Referring specifically to FIG. 5A, assume that an on-device conversation with a user (e.g., Jane Doe) of the client device is initiated as indicated by interaction 500A1. In various implementations, the on-device conversation with Jane Doe may be initiated as part of a dialog between Jane Doe and an automated assistant executing at least in part at the client device. In these implementations, interaction 500A1 may be a voice-based interaction or a text-based interaction. For example, Jane Doe may invoke the automated assistant executing at least in part at the client device (e.g., by actuation of a software or hardware button, by speaking a particular term or phrase such as "Assistant", "Hey Assistant", or the like, and/or by other means) and provide unstructured free-form natural language input 552A1 as spoken input. As another example, Jane Doe may access an automated assistant application that is accessible at the client device and that is associated with the automated assistant and provide unstructured free-form natural language input 552A1 as typed input.

For the sake of example in FIG. 5A, assume that Jane Doe provides unstructured free-form natural language input 552A1 of "Ask the restaurant I ate dinner at yesterday if they found my red leather jacket" as spoken input. In this example, the automated assistant can process, using ASR model(s), audio data that captures the spoken input to generate ASR output such as recognized text corresponding to the spoken input (e.g., recognized text of "Ask the restaurant I ate dinner at yesterday if they found my red leather jacket"). Further, the automated assistant can process, using NLU model(s), the ASR output to generate NLU output, such as intent(s), slot value(s) for parameters associated with the intent(s), and/or other NLU output. Notably, the spoken input explicitly includes an intent of [submit query] (or the like) with a slot value of "did you find [Jane Doe's] red leather jacket" (or the like) for a [query content] parameter (e.g., task data). However, the spoken input only implicitly identifies an entity (e.g., "the restaurant I ate dinner at yesterday").

Accordingly, in this example, the automated assistant may utilize data from various sources to resolve the entity that is implicitly included in the spoken input. (e.g., user data for Jane Doe and/or other information) For instance, the automated assistant may leverage historical location information of Jane Doe to identify the restaurant the she ate dinner at yesterday, calendar information that includes a reservation to identify the restaurant the she ate dinner at yesterday, software application information that includes a reservation to identify the restaurant she ate dinner at yesterday, email information that includes a confirmation email to identify the restaurant she ate dinner at yesterday, and/or other information. As a result, further assume that "the restaurant I ate dinner at yesterday" corresponds to a restaurant entity of "Hypothetical Café" (e.g., entity data). Thus, the automated assistant may provide a response 554A1 of "Okay, calling Hypothetical Café, I'll let you know if I need anything or if they found it" for audible and/or visual presentation to Jane Doe to indicate that the automated assistant will perform a task of submitting the query to the entity of "Hypothetical Café".

In this example, and based on the unstructured free-form natural language input 552A1, the automated assistant can cause the client device and/or the remote system to generate a chatbot to perform the task of submitting the query to the representative of "Hypothetical Café". In some implementations, the chatbot may correspond to, for example, a previously trained LLM that is fine-tuned based on the unstructured free-form natural language input 552A1 using various fine-tuning techniques (e.g., as described with respect to FIG. 2). In other implementations, the chatbot may correspond to, for example, a previously trained LLM that is not fine-tuned based on the unstructured free-form natural language input 552A1, but is primed based on one or more of the plurality of unstructured free-form natural language input. Further assume that the chatbot will engage in a corresponding conversation with a representative of "Hypothetical Café" as part of a phone call to perform the task of submitting the query to the representative of "Hypothetical Café". In this example, the automated assistant may determine a corresponding identifier that is associated with "Hypothetical Café", such as a phone number that can be utilized to initiate the corresponding conversation with the representative of "Hypothetical Café" (e.g., entity data).

Accordingly, and as shown in interaction 500A2, the automated assistant can cause the chatbot to be implemented at a computing device, such as the client device in implementations where the chatbot is generated locally at the client device or the remote system in implementations where the chatbot is generated remotely from the client device. This enables the chatbot to place the phone call to the phone number that is associated with "Hypothetical Café" in furtherance of performance of the task of submitting the query to the representative of "Hypothetical Café". Further assume that subsequent to placing the telephone call, the chatbot and the representative of "Hypothetical Café" engage in a corresponding conversation. For instance, further assume that the representative of "Hypothetical Café"

answers the incoming telephone call and provides spoken input 552A2 of "Hello, this is John Smith at Hypothetical Café, how may I help you?". In this example, the automated assistant can cause the chatbot to process the intent of [submit query] (or the like) with a slot value of "did you find [Jane Doe's] red leather jacket") for a [query content] parameter (e.g., the task data), audio data that captures spoken input 552A2, textual data corresponding to the audio data that captures spoken input 552A2 (e.g., determined using ASR model(s)), and/or any context conversation data to generate an instance of synthesized speech audio data. The instance of the synthesized speech audio data can be audibly rendered at a client device of the representative of "Hypothetical Café" and can capture synthesized speech 554A2 of "Hi, I'm a virtual assistant calling on behalf of Jane Doe to see if anyone found a red leather jacket yesterday".

In this example, and in generating the instance of the synthesized speech audio data, the automated assistant can cause this data to be applied as input across the previously trained LLM that is fine-tuned and/or primed based on the unstructured free-form natural language input 552A1 to generate output, such as a probability distribution over a vocabulary of terms and/or phrases. Based on the probability distribution over the vocabulary of terms and/or phrases, the automated assistant can cause the chatbot to select textual data corresponding to the synthesized speech 554A2. Further, the automated assistant can cause the chatbot to process, using TTS model(s), the textual data corresponding to the synthesized speech 554A2 to generate the instance of the synthesized speech audio data that is audibly rendered at a client device of the representative of "Hypothetical Café". Moreover, the automated assistant is capable of causing the chatbot to generate the output and/or select the textual data corresponding to the synthesized speech 554A2 due at least in part to the previously trained LLM being fine-tuned and/or primed based on the unstructured free-form natural language input 552A1 provided by Jane Doe during interaction 500A1. Thus, the automated assistant is capable of causing the chatbot to perform the task of submitting the query to the representative of the entity of "Hypothetical Café" and on behalf of Jane Doe.

Further assume that the representative of "Hypothetical Café" responds to the synthesized speech 554A2 with spoken input 556A2 of "Please hold while I go check lost and found". In this example, the automated assistant can cause the chatbot to process audio data that captures spoken input 556A2, textual data corresponding to the audio data that captures spoken input 556A2 (e.g., determined using ASR model(s)), and/or any context conversation data to generate an additional instance of synthesized speech audio data. The additional instance of the synthesized speech audio data can be audibly rendered at the client device of the representative of "Hypothetical Café" and can capture synthesized speech 558A2 of "Okay". Further, the automated assistant can cause the chatbot to monitor for additional spoken inputs from the representative of "Hypothetical Café" to indicate that the representative has re-joined the phone call subsequent to the representative placing the chatbot on hold.

Further assume that the representative of "Hypothetical Café" returns from on hold by providing spoken input 560A2 of "I found her red leather jacket, I'll keep it at the hostess stand for her". In this example, the automated assistant can cause the chatbot to process the audio data that captures spoken input 560A2, textual data corresponding to the audio data that captures spoken input 560A2 (e.g., determined using ASR model(s)), and/or any context conversation data to generate a further additional instance of synthesized speech audio data. The further additional instance of the synthesized speech audio data can be audibly rendered at the client device of the representative of "Hypothetical Café" and can capture synthesized speech 562A2 of "Thank you, I will let her know". Further, the automated assistant can cause the chatbot to terminate the phone call with the representative of "Hypothetical Café".

In this example, the automated assistant may cause the chatbot to terminate the corresponding conversation with the representative of "Hypothetical Café" in response to determining that the task is successfully completed. The automated assistant or the chatbot can determine that the task is successfully completed based on, for instance, the representative of "Hypothetical Café" responding to the query with confirmation that Jane Doe did, in fact, leave her red leather jacket at Hypothetical Café the previous night and that she can pick up at the hostess stand. Accordingly, based on the response to the query provided by the representative of "Hypothetical Café", the automated assistant can determine responsive content 552A3 that can be provided for presentation to Jane Doe at interaction 500A3. The responsive content 552A3 can include a result of performance of the task by the chatbot, such as "Your red leather jacket is at Hypothetical Café, they'll leave it at the hostess stand for you". Thus, the interaction 500A3 may be a notification that is generated for presentation to the user, or provided for presentation to the user during a subsequent dialog session between Jane Doe and the automated assistant executing at least in part at her client device.

Notably, in interaction 500A2, the chatbot implements various peripheral behaviors. For instance, the chatbot introduces itself as a "virtual assistant calling on behalf of Jane Doe" in synthesized speech 554A2 by utilizing greetings behaviors that enable the chatbot to identify Jane Doe and to identify itself as a chatbot; the chatbot places itself on hold subsequent to synthesized speech 558A2 by utilizing on hold behaviors that enable the chatbot to pause and resume the corresponding conversation; and the voice terminates the phone call subsequent to providing the synthesized speech 562A2 by utilizing bailout behaviors to terminate the corresponding conversation with the representative of "Hypothetical Café". These peripheral behaviors are one non-limiting example of using the previously trained LLM enables prior to fine-tuning and/or priming the chatbot enables the chatbot to perform generalized aspects of conversation and without the unstructured free-form natural language input 552A1 having to specify that the chatbot is able to perform these generalized aspects of conversation. Further, it should be noted that other peripheral behaviors may be implemented by the chatbot and that those described with respect to FIG. 5A are for the sake of example and are not meant to be limiting.

Moreover, in various implementations, the chatbot generated to perform the task of submitting the query to the representative of "Hypothetical Café" may be discarded. For example, the chatbot may be discarded in response to determining that the task was successfully completed. As another example, the chatbot may be discarded in response to determining that the chatbot may not be utilized to engage in any additional corresponding conversations since the task was successfully completed. However, in various implementations, the chatbot may not always successfully perform the task during the corresponding conversation.

Referring specifically to FIG. 5B, assume that an on-device conversation with a user (e.g., Jane Doe) of the client device is initiated as indicated by interaction 500B1 in the same or similar manner described with respect to FIG. 5A. For the sake of example in FIG. 5B, assume that Jane Doe provides unstructured free-form natural language input 552B1 of "Tell Bobby Jones the locksmith that I transferred the money to his quick cash account" as spoken input. In this example, the automated assistant can process, using ASR model(s), audio data that captures the spoken input to generate the ASR output. Further, the automated assistant can process, using NLU model(s), the ASR output to generate the NLU output. Notably, the spoken input explicitly includes an intent of [notify entity] (or the like) with a slot value of "I transferred the money to [your] quick cash account" (or the like) for a [notification content] parameter (e.g., task data), and the spoke input explicitly includes an [entity] of [Bobby Jones the locksmith] (e.g., entity data). Thus, the automated assistant may provide a response 554A2 of "Okay, I'll let Bobby Jones know" for audible and/or visual presentation to Jane Doe to indicate that the automated assistant will perform a task of notifying the entity of "Bobby Jones".

In this example, and based on the unstructured free-form natural language input 552B1, the automated assistant can cause the client device and/or the remote system to generate a chatbot to perform the task of notifying the representative of "Bobby Jones" (e.g., where "Bobby Jones" is the entity and where "Bobby Jones" is the representative of himself). In this example, the automated assistant may determine a corresponding identifier that is associated with "Bobby Jones", such as a phone number or contact entry that can be utilized to initiate the corresponding conversation with the representative of ""Bobby Jones". Accordingly, and as shown in interaction 500B2, the automated assistant can cause the chatbot to be implemented at a computing device in the same or similar manner described with respect to FIG. 5A. This enables the chatbot to place the phone call to the phone number that is associated with "Bobby Jones" in furtherance of performance of the task of notifying "Bobby Jones".

Further assume that subsequent to placing the telephone call, the chatbot and the representative of "Bobby Jones" engage in a corresponding conversation. For instance, further assume that the representative of "Bobby Jones" answers the incoming telephone call and that the chatbot generates an instance of synthesized speech audio data in the same or similar manner described with respect to FIG. 5A and that the synthesized speech audio data is audibly rendered at a client device of the representative of "Bobby Jones". In this example, further assume that the instance of synthesized speech audio data captures synthesized speech 552B2 of "Hi, I'm a virtual assistant calling on behalf of Jane Doe, I wanted to let you know that she transferred the money she owed you to your quick cash account".

Further assume that the representative of "Bobby Jones" responds to the synthesized speech 552B2 with spoken input 554B2 of "I don't know what you're talking about, I don't know any Jane Doe?". In this example, the automated assistant can cause the chatbot to process at least audio data that captures spoken input 554B2 to generate an additional instance of synthesized speech audio data. The additional instance of the synthesized speech audio data can be audibly rendered at the client device of the representative of "Bobby Jones" and can capture synthesized speech 556B2 of "In that case, I'll reach out to Jane". Put another way, based on the failure to successfully perform the task (e.g., based on determining that "Bobby Jones" is not expecting the transfer the money to his quick cash account and/or based on determining that "Bobby Jones" does not know who Jane Doe is), the automated assistant can cause the chatbot to utilize the bailout behaviors that enable the chatbot to prompt Jane Doe to join the corresponding conversation.

Accordingly, and as shown at interaction 500B3, the automated assistant can cause the chatbot to generate and provide prompt 552B3 of "Hi Jane, I need you to talk to Bobby Jones the locksmith about the payment" for presentation to Jane Doe. The prompt may include a certain reason with respect to why the chatbot was unable to successfully perform the task (e.g., "Bobby Jones does not know who you are"). As a result, and as shown at interaction 500B4, Jane Doe may join the corresponding conversation in response to the prompt 500B3, and provide spoken input 552B1 of "Hi Bobby, sorry for the confusion, this is Jane Doe, the payment I transferred to you was on behalf of my father, John Doe, and the work you did for him last week". Thus, the automated assistant can cause the chatbot to engage in the corresponding conversation with the representative of "Bobby Jones", but can cause the chatbot to prompt Jane Doe to join the corresponding conversation in instances where the chatbot does not successfully complete the task.

Notably, in the examples of FIGS. 5A and 5B, Jane Doe is not an active participant in the corresponding conversation between the chatbot and the representatives for the initial interactions with the corresponding representatives (e.g., interaction 500A2 of FIG. 5A and interaction 500B2 of FIG. 5B). However, the automated assistant can cause the chatbot to prompt Jane Doe to join the corresponding conversation as needed (e.g., as illustrated in the Example of FIG. 5B). Further, in various implementations, a transcription of the corresponding conversation may be provided for presentation to Jane Doe as the corresponding conversation progresses and/or subsequent to the corresponding conversation being terminated. In these implementations, the user may monitor the corresponding conversations and proactively join one or more of the corresponding conversations without receiving any prompt.

Although FIGS. 5A and 5B are described with respect to the corresponding conversations being phone calls, it should be understood that is for the sake of example and is not meant to be limiting. For example, the corresponding conversations may be text-based conversations conducted through any text-based platform or service through which the chatbot can engage in the corresponding conversation with the entity or the representative thereof (e.g., text or SMS messaging, email, and/or other text-based platforms). Further, although the corresponding representatives in the examples of FIGS. 5A and 5B are humans, it should be understood that is for the sake of example and is not meant to be limiting. For instance, the corresponding representatives may be corresponding additional chatbots that are deployed on behalf of the corresponding entities. In these instances, the chatbot may engage in the corresponding conversations with the corresponding additional chatbots. Moreover, although the unstructured free-form natural language inputs of FIGS. 5A and 5B are described with respect to being a single sentence, it should be understood that is for the sake of example and is not meant to be limiting. Notably, the chatbots generated and implemented in FIGS. 5A and 5B may be different chatbots by virtue of the user providing different unstructured free-form natural language inputs for different task(s).

Figure 6A:
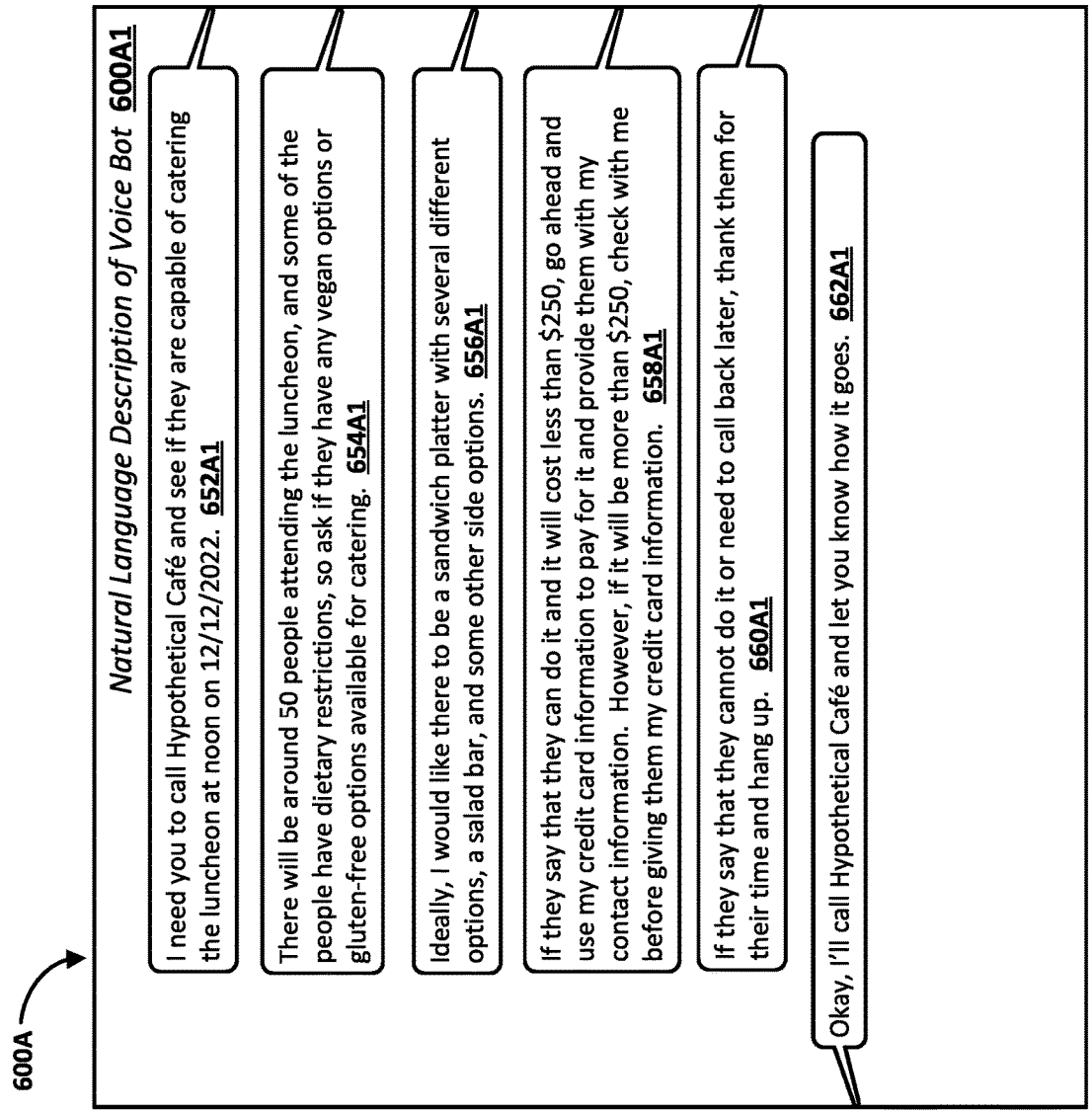
FIG. 6A and FIG. 6B depict additional non-limiting example interactions of corresponding unstructured free-form natural language input being utilized to generate a corresponding chatbot, and the corresponding chatbot performing corresponding task(s) based on the corresponding unstructured free-form natural language input, in accordance with various implementations.
Figure 6B:
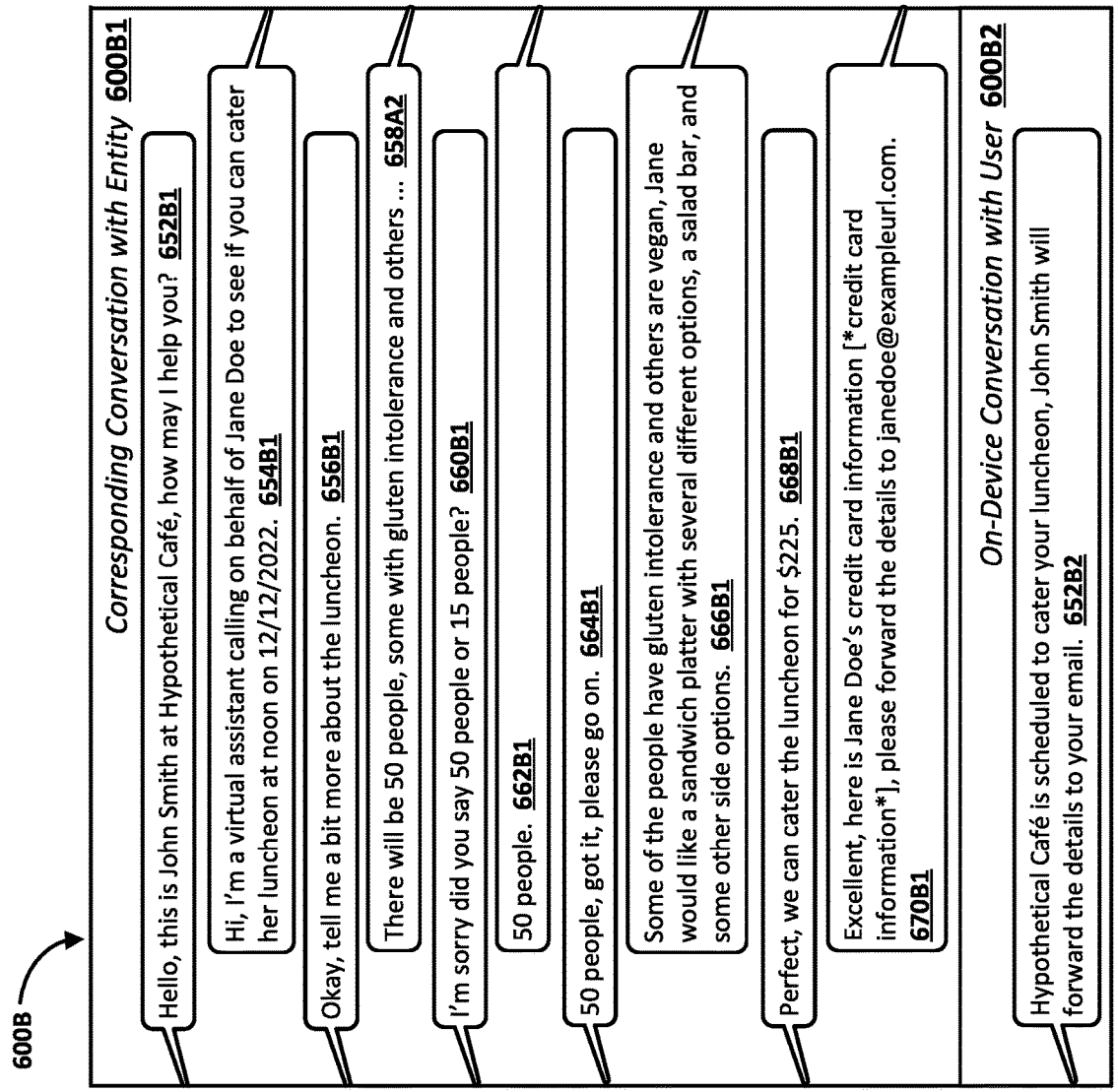

Turning now to FIGS. 6A and 6B, additional non-limiting example interactions of corresponding unstructured free-form natural language input being utilized to generate a corresponding chatbot, and the corresponding chatbot performing corresponding task(s) based on the corresponding unstructured free-form natural language input are depicted. Notably, interactions 600A and 600B described with respect to FIGS. 6A and 6B, respectively, may be implemented across multiple computing devices to cause the chatbot to perform the corresponding task(s) to be performed. For example, the corresponding unstructured free-form natural language input described with respect to the examples of FIGS. 6A and 6B may be received at a client device of a user (e.g., the client device 110 of FIG. 1), the chatbot described with respect to the examples of FIGS. 6A and 6B may be generated at the client device of the user (e.g., the client device 110 of FIG. 1) and/or at a remote system (e.g., the remote system 160 from FIG. 1), the chatbot described with respect to the examples of FIGS. 6A and 6B may be implemented at the client device of the user (e.g., the client device 110 of FIG. 1) and/or at a remote system (e.g., the remote system 160 from FIG. 1) and communicate with a representative of an entity via an additional computing device of the representative. Each of these computing devices may include respective components, such as user interface input components (e.g., microphone(s), vision component(s), presence sensor(s), touch sensitive display(s), keyboard(s), hardware button(s), software button(s), etc.), user interface output components (e.g., touch sensitive display(s), speaker(s), monitor(s), projector(s), etc.), network interface(s), and/or other components. Accordingly, although interactions 600A and 600B of FIGS. 6A and 6B are depicted within a single interface, respectively, it should be understood that is for the sake of illustrating various techniques described herein and is not meant to be limiting.

Referring specifically to FIG. 6A, assume that an on-device conversation with a user (e.g., Jane Doe) of the client device is initiated as indicated by interaction 600A1 in the same or similar manner described with respect to FIGS. 5A and 5B. However, in contrast with the examples in FIGS. 5A and 5B, assume that Jane Doe provides a plurality of spoken inputs 652A1, 654A1, 656A1, 658A1, and 660A1 as shown in interaction 600A. Although the plurality of spoken inputs 652A1, 654A1, 656A1, 658A1, and 660A1 convey details of a more complex task (e.g., booking the catering for the luncheon) than those described with respect to FIGS. 5A and 5B (e.g., submitting the query in FIG. 5A and providing the notification in FIG. 5B), the automated assistant can still generate a chatbot to book the catering for the luncheon and cause the chatbot to engage in a corresponding conversation with a representative of "Hypothetical Café".

In this example, the task may be considered more complex than the tasks from FIGS. 5A and 5B based on the task of FIG. 6A including a plurality of sub-tasks. These sub-tasks may include, for example, determining whether "Hypothetical Café" is available to cater the luncheon at the specified date/time and for the specified number of people (based on the spoken input 652A1 and the spoken input 654A1); determining whether "Hypothetical Café" is available to cater the luncheon with the specified dietary restrictions or menu requests (based on the spoken input 654A1); determining whether "Hypothetical Café" is available to cater the luncheon for the specified price (based on the spoken input 658A1); and proactively paying for the luncheon if "Hypothetical Café" is available to cater the luncheon for the specified price (based on the spoken input 658A1). Notably, each of these sub-tasks include disparate intents and disparate slots values for parameters associated with the disparate intents. As a result, in the example of FIG. 6A, the chatbot may be fine-tuned and/or primed with more task data than the chatbots in FIGS. 5A and 5B since the task in FIG. 6A is more complex. Thus, the automated assistant may provide a response 662A1 of "Okay, I'll call Hypothetical Café and let you know how it goes" for audible and/or visual presentation to Jane Doe to indicate that the automated assistant will perform a task of booking the luncheon with the entity of "Hypothetical Café".

Referring specifically to FIG. 6B, and as shown in interaction 600B1, the automated assistant can cause the chatbot to be implemented at a computing device in the same or similar manner described with respect to FIGS. 5A and 5B. Further assume that subsequent to placing the telephone call, the chatbot and the representative of "Hypothetical Café" engage in a corresponding conversation. For instance, further assume that the representative of "Hypothetical Café" answers the incoming telephone call and provides spoken input 652B1 of "Hello, this is John Smith at Hypothetical Café, how may I help you?". In this example, the automated assistant can process the task data determined based on interaction 600A1, audio data that captures spoken input 652B1, textual data corresponding to the audio data that captures spoken input 652B1 (e.g., determined using ASR model(s)), and/or any context conversation data to generate an instance of synthesized speech audio data in the same or similar manner described with respect to FIGS. 5A and 5B. The instance of the synthesized speech audio data can be audibly rendered at a client device of the representative of "Hypothetical Café" and can capture synthesized speech 654B1 of "Hi, I'm a virtual assistant calling on behalf of Jane Doe to see if you can cater her luncheon at noon on Dec. 12, 2022".

Further assume that the representative of "Hypothetical Café" responds to the synthesized speech 654B1 with spoken input 656B1 of "Okay, tell me a bit more about the luncheon". In this example, the automated assistant can cause the chatbot to process the task data, audio data that captures spoken input 656B1, textual data corresponding to the audio data that captures spoken input 656B1 (e.g., determined using ASR model(s)), and/or any context conversation data to generate an additional instance of synthesized speech audio data. The additional instance of the synthesized speech audio data can be audibly rendered at the client device of the representative of "Hypothetical Café" and can capture synthesized speech 658B1 of "There will be 50 people, some with gluten intolerance and other . . . ", but that the chatbot is interrupted by the representative of "Hypothetical Café" providing spoken input 660B1 of "I'm sorry did you say 50 people or 15 people?". In this example, the automated assistant can cause the chatbot to repeat itself stating "50 people" in synthesized speech 662B1 by utilizing clarification behaviors that enable the chatbot to clarify and/or repeat information that was previously provided during the corresponding conversation.

Further assume that the representative of "Hypothetical Café" responds to the synthesized speech 662B1 with spoken input 664B1 of "50 people got it, please go on". In this example, the automated assistant can cause the chatbot to resume the corresponding conversation by generating a further additional instance of synthesized speech that includes information that was not provided to the representative of "Hypothetical Café". For instance, the further additional instance of the synthesized speech audio data can be audibly rendered at the client device of the representative of "Hypothetical Café" and can capture synthesized speech 666B1 of "Some of the people have gluten intolerance and others are vegan, Jane would like a sandwich platter with several different options, a salad bar, and other side options". Further assume that the representative of "Hypothetical Café" responds to the synthesized speech 666B1 with spoken input 668B1 of "Perfect, we can cater the luncheon for $225." As a result, the automated assistant can cause the chatbot to complete the task of booking the luncheon based on successful performance of all of the other sub-tasks of the task by generating a yet further additional instance of synthesized speech audio data. The yet further additional instance of the synthesized speech audio data can be audibly rendered at the client device of the representative of "Hypothetical Café" and can capture synthesized speech 670B1 of ""Excellent, here is Jane Doe's credit card information [*provide credit card information*], please forward the details to janedoe@exampleurl.com".

In this example, the automated assistant may cause the chatbot to terminate the corresponding conversation with the representative of "Hypothetical Café" in response to determining that the task (or all of the sub-tasks) is successfully completed. The automated assistant or the chatbot can determine that the task is successfully completed based on, for instance, the representative of "Hypothetical Café" confirmation of catering for the luncheon. Accordingly, based on the successful booking of the luncheon with the representative of "Hypothetical Café", the automated assistant can determine responsive content 652B2 that can be provided for presentation to Jane Doe at interaction 600B2. The responsive content 652B2 can include a result of performance of the task by the chatbot, such as "Hypothetical Café is scheduled to cater your luncheon, John Smith will forward the details to your email". Thus, the interaction 600B2 may be a summary of interaction 600B1 that generated for presentation to the user, or provided for presentation to the user during a subsequent dialog session between Jane Doe and the automated assistant executing at least in part at her client device.

Figure 7:
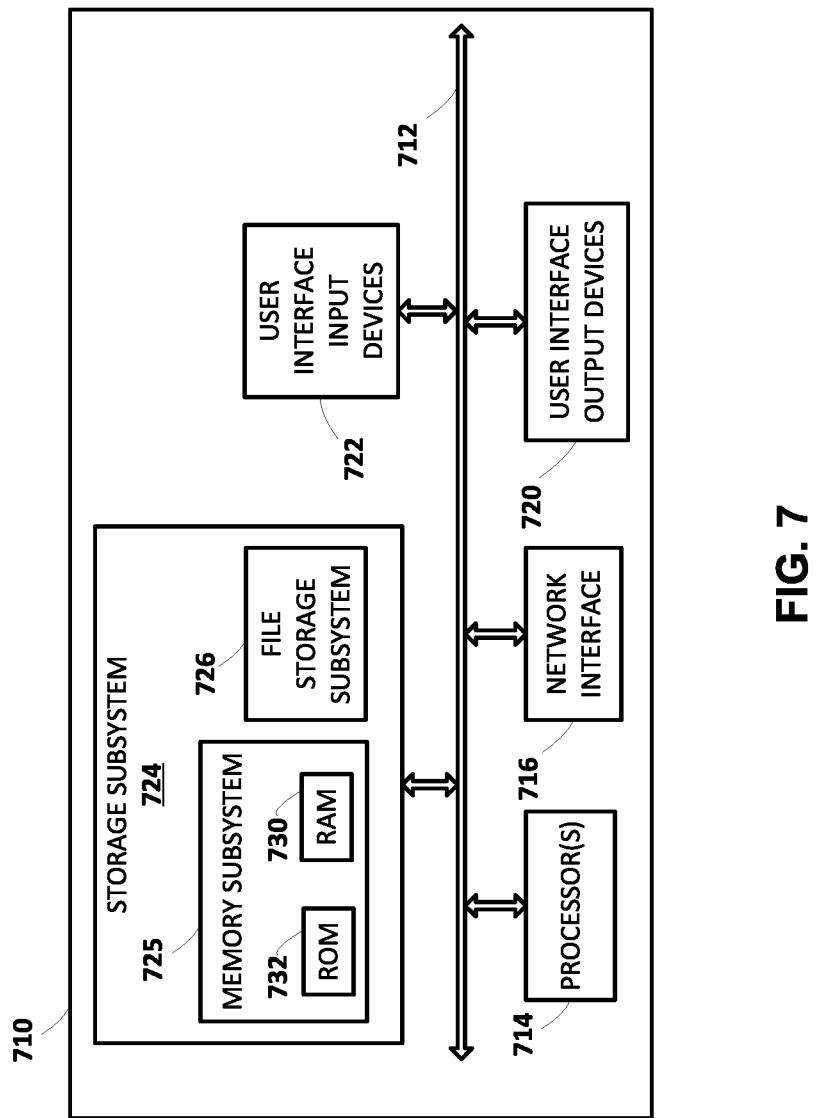
FIG. 7 depicts an example architecture of a computing device, in accordance with various implementations.

Turning now to FIG. 7, a block diagram of an example computing device 710 that may optionally be utilized to perform one or more aspects of techniques described herein. In some implementations, one or more of a client device, remote system component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display (e.g., a touch sensitive display), audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors of a client device is provided, and includes: receiving, at the client device, unstructured free-form natural language input from a user of the client device, and, in response to receiving the unstructured free-form natural language input that includes the one or more tasks associated with the entity, generating, based on at least the unstructured free-form natural language input and locally at the client device, a chatbot to perform the one or more tasks associated with the entity and on behalf of the user. The unstructured free-form natural language input includes one or more tasks associated with an entity. The method further includes causing the chatbot to perform the one or more tasks associated with the entity and on behalf of the user. Causing the chatbot to perform the one or more tasks associated with the entity and on behalf of the user includes causing the chatbot to engage in a corresponding conversation with the entity; during the corresponding conversation with the entity: causing the chatbot to render a plurality of instances of synthesized speech audio data for presentation to a representative of the entity; and receiving responsive content that is responsive to at least the given instance of synthesized speech audio data. At least a given instance of synthesized speech audio data, from among the plurality of instances of synthesized speech audio data, conveys details of the one or more tasks associated with the entity. The method further includes causing the responsive content to be provided for presentation to the user of the client device.

These and other implementations of technology disclosed herein can optionally include one or more of the following features.

In some implementations, generating the chatbot to perform the one or more tasks associated with the entity and on behalf of the user may include obtaining a previously trained large language model (LLM); causing the previously trained LLM to be fine-tuned based on the unstructured free-form natural language input to generate a fine-tuned LLM; and utilizing the fine-tuned LLM as the chatbot.

In some versions of those implementations, causing the chatbot to render the given instance of synthesized speech audio data for presentation to the representative may include processing, using the fine-tuned LLM, one or more features of the unstructured free-form natural language input to generate a given instance of textual data that conveys the details of the one or more tasks associated with the entity; processing, using a text-to-speech (TTS) model, the given instance of textual data that conveys the details of the one or more tasks associated with the entity to generate the given instance of synthesized speech audio data; and transmitting, from the client device and to an additional client device of the representative, the given instance of synthesized speech audio data. Transmitting the given instance of synthesized speech audio data to the additional client device may cause the additional client device to audibly render the given instance of synthesized speech audio data for presentation to the representative via one or more speakers of the additional client device.

In some further versions of those implementations, the method may further include processing, using the fine-tuned LLM, and along with one or more of the features of the unstructured free-form natural language input, a corresponding context of the corresponding conversation to generate the given instance of textual data that conveys the details of the one or more tasks associated with the entity.

In additional or alternative further versions of those implementations, the method may further include, in response to the given instance of synthesized speech audio data being audibly rendered for presentation to the representative via the one or more speakers of the additional client device: receiving, at the client device and from the additional client device, a given instance of response audio data that includes the responsive content that is responsive to at least the given instance of synthesized speech audio data; processing, using an automatic speech recognition (ASR) model, the given instance of response audio data to generate a given instance of response textual data; and determining, based on the given instance of response textual data, whether performance of one or more of the tasks is successfully completed during the corresponding conversation.

In some yet further versions of those implementations, causing the responsive content to be provided for presentation to the user of the client device may be in response to determining that one or more of the tasks is successfully completed during the corresponding conversation.

In additional or alternative yet further versions of those implementations, the method may further include, in response to determining that one or more of the tasks is not successfully completed during the corresponding conversation: causing the chatbot to render an indication that the user is being prompted to join the corresponding conversation for presentation to the representative of the entity; generating a prompt that requests the user to join the corresponding conversation; and causing the prompt that requests the user to join the corresponding conversation to be provided for presentation to the user at the client device.

In even yet further versions of those implementations, the prompt may further include a certain reason with respect to why one or more of the tasks is not successfully completed during the corresponding conversation.

In additional or alternative further versions of those implementations, the method may further include, prior to processing one or more of the features of the unstructured free-form natural language input using the fine-tuned LLM, extracting one or more of the features from the unstructured free-form natural language input.

In some yet further versions of those implementations, one or more of the features may be explicitly included in the unstructured free-form natural language input, and extracting one or more of the features from the unstructured free-form natural language input that are explicitly included in the unstructured free-form natural language input may include utilizing an input parser to extract one or more of the features are explicitly included in the unstructured free-form natural language input.

In additional or alternative yet further versions of those implementations, one or more of the features may be implicitly included in the unstructured free-form natural language input, and extracting one or more of the features from the unstructured free-form natural language input that are implicitly included in the unstructured free-form natural language input may include utilizing an input parser to identify one or more of the features are implicitly included in the unstructured free-form natural language input; and utilizing a coreference resolver to extract one or more of the features are implicitly included in the unstructured free-form natural language input.

In even yet further versions of those implementations, the coreference resolver may access user data generated locally at the client device to extract one or more of the features are implicitly included in the unstructured free-form natural language input, and the user data may include one or more of: historical location data, historical temporal data, user preference data, user account data, calendar information, or email data.

In additional or alternative versions of those implementations, the previously trained LLM may be stored in on-device storage of the client device, and the previously trained LLM that may be stored in the on-device storage of the client device may be a sparsified version of a global previously trained LLM that is available at a remote system communicatively coupled to the client device.

In some further versions of those implementations, the fine-tuned LLM may be stored in the on-device storage of the client device.

In yet further versions of those implementations, the method may further include, subsequent to causing the chatbot to perform the one or more tasks associated with the entity and on behalf of the user: discarding the fine-tuned LLM from the on-device storage of the client device; and refraining from discarding the previously trained LLM from the on-device storage of the client device.

In some implementations, the method may further include receiving, at the client device, additional unstructured free-form natural language input from the user of the client device; and in response to receiving the additional unstructured free-form natural language input that includes the one or more additional tasks associated with the entity or the additional entity: generating, based on at least the additional natural language input and locally at the client device, an additional chatbot to perform the one or more additional tasks associated with the entity or the additional entity and on behalf of the user. The additional unstructured free-form natural language input may include one or more additional tasks associated with the entity or an additional entity. The method may further include causing the additional chatbot to perform the one or more additional tasks associated with the entity or the additional entity and on behalf of the user. Causing the additional chatbot to perform the one or more additional tasks associated with the entity or the additional entity and on behalf of the user may include causing the additional chatbot to engage in an additional corresponding conversation with the entity or the additional entity; during the additional corresponding conversation with the entity or the additional entity: causing the chatbot to render a plurality of additional instances of synthesized speech audio data for presentation to the representative of the entity or an additional representative of the additional entity; and receiving additional responsive content that is responsive to at least the given additional instance of synthesized speech audio data; and causing the additional responsive content to be provided for presentation to the user of the client device. At least a given additional instance of synthesized speech audio data, from among the plurality of additional instances of synthesized speech audio data, conveys additional details of the one or more additional tasks associated with the entity or the additional entity In some implementations, the method may further include identifying, based on the unstructured free-form natural language input, the entity that is associated with the one or more tasks; determining a corresponding identifier for the entity that is associated with the one or more tasks; and utilizing the corresponding identifier for the entity that is associated with the one or more tasks to cause the chatbot to engage in the corresponding conversation with the entity.

In some versions of those implementations, the corresponding identifier for the entity that is associated with the one or more tasks may be a corresponding telephone number for the entity, and utilizing the corresponding identifier for the entity that is associated with the one or more tasks to cause the chatbot to engage in the corresponding conversation with the entity may include causing the chatbot to utilize the corresponding telephone number for the entity to initiate an automated telephone call, that is automated on behalf of the user, to perform the one or more tasks associated with the entity.

In some implementations, causing the chatbot to engage in the corresponding conversation with the entity may include causing the chatbot to answer a telephone call that is received at the client device and from the representative of the entity; and causing the chatbot to engage in the corresponding conversation with the entity as part of the telephone call.

In some implementations, the user may not be an active participant in the corresponding conversation between the chatbot and the representative.

In some implementations, during the corresponding conversation with the entity, the method may further include receiving, from the representative, a request for the user to join the corresponding conversation; and in response to receiving the request for the user to join the corresponding conversation: generating a prompt that requests the user to join the corresponding conversation; and causing the prompt that requests the user to join the corresponding conversation to be provided for presentation to the user at the client device.

In some implementations, the entity may be explicitly identified in the unstructured free-form natural language input.

In some implementations, the entity may not be explicitly identified in the unstructured free-form natural language input, the entity may be a particular type of entity, the particular type of entity may be explicitly identified in the unstructured free-form natural language input, and the one or more tasks may be associated with the particular type of entity.

In some versions of those implementations, the one or more tasks may also be associated with additional entity that is in addition to the entity and that is of the particular type of entity. Causing the chatbot to perform the one or more tasks associated with the entity and on behalf of the user further may include causing the chatbot to engage in an additional corresponding conversation with the additional entity; during the additional corresponding conversation with the additional entity: causing the chatbot to render a plurality of additional instances of synthesized speech audio data for presentation to an additional representative of the additional entity; and receiving additional responsive content that is responsive to at least the given additional instance of synthesized speech audio data. At least a given additional instance of synthesized speech audio data, from among the plurality of additional instances of synthesized speech audio data, may convey the details of the one or more tasks that are also associated with the additional entity. The method may further include causing the additional responsive content to be provided for presentation to the user of the client device.

In some further versions of those implementations, the chatbot may conduct the corresponding conversation with the entity and the additional corresponding conversation with the additional entity in a parallel manner.

In additional or alternative further versions of those implementations, the chatbot may conduct the additional corresponding conversation with the additional entity subsequent to the corresponding conversation with the entity and in response to determining that one or more of the tasks is not successfully completed during the corresponding conversation.

In some implementations, the representative of the entity may be a human representative. In other implementations, the representative of the entity may be an additional chatbot that is trained to conduct the corresponding conversation on behalf of the entity.

In some implementations, the unstructured free-form natural language input may be typed input or spoken input that conveys the details of the one or more tasks associated with the entity and without defining a corresponding dialog state map, dialog states of the corresponding dialog state map, or dialog state transitions of the corresponding dialog state map to be utilized in performance of the one or more tasks associated with the entity.

In some versions of those implementations, the unstructured free-form natural language input may be typed input that conveys the details of the one or more tasks associated with the entity in one or more sentences, and the responsive content to be provided for presentation to the user of the client device may be a result of performance of the one or more tasks associated with the entity.

In additional or alternative versions of those implementations, the unstructured free-form natural language input may be typed input that conveys the details of the one or more tasks associated with the entity in one or more paragraphs, and the responsive content to be provided for presentation to the user of the client device may be a summary of the corresponding conversation with the entity.

In some implementations a method implemented by one or more processors of a remote system is provided, and includes: receiving, at the remote system and from a client device, an indication of unstructured free-form natural language input from a user of the client device; and in response to receiving the indication of the unstructured free-form natural language input that includes the one or more tasks associated with an entity: generating, based on at least the indication of the natural language input and remotely at the remote system, a chatbot to perform the one or more tasks associated with the entity and on behalf of the user. The unstructured free-form natural language input includes one or more tasks associated with an entity. The method further includes causing the chatbot to perform the one or more tasks associated with the entity and on behalf of the user. Causing the chatbot to perform the one or more tasks associated with the entity and on behalf of the user includes causing the chatbot to engage in a corresponding conversation with the entity; during the corresponding conversation with the entity: causing the chatbot to render a plurality of instances of synthesized speech audio data for presentation to a representative of the entity; and receiving responsive content that is responsive to at least the given instance of synthesized speech audio data. At least a given instance of synthesized speech audio data, from among the plurality of instances of synthesized speech audio data, conveys details of the one or more tasks associated with the entity. The method further includes transmitting, from the remote system and to the client device, an indication of the responsive content. Transmitting the indication of the responsive content to the client device causes the client device to provide the responsive content for presentation to the user of the client device.

These and other implementations of technology disclosed herein can optionally include one or more of the following features.

In some implementations, generating the chatbot to perform the one or more tasks associated with the entity and on behalf of the user may include obtaining a previously trained large language model (LLM); causing the previously trained LLM to be fine-tuned based on the unstructured free-form natural language input to generate a fine-tuned LLM; and utilizing the fine-tuned LLM as the chatbot.

In some versions of those implementations, the previously trained LLM may be stored in remote storage of the remote system, and the previously trained LLM that may be stored in the remote storage of the remote system may be an unsparsified version of a global previously trained LLM that is available at the remote system communicatively coupled to the client device.

In some further versions of those implementations, the fine-tuned LLM may be stored in the remote storage of the remote system.

In yet further versions of those implementations, the method may further include, subsequent to causing the chatbot to perform the one or more tasks associated with the entity and on behalf of the user: discarding the fine-tuned LLM from the remote storage of the remote system; and refraining from discarding the previously trained LLM from the remote storage of the remote system.

In some implementations a method implemented by one or more processors of a client device is provided, and includes: receiving, at the client device, unstructured free-form natural language input from a user of the client device; and in response to receiving the indication of the unstructured free-form natural language input that includes the one or more tasks associated with an entity: generating, based on at least the indication of the natural language input and remotely at the remote system, a chatbot to perform the one or more tasks associated with the entity and on behalf of the user. The unstructured free-form natural language input includes one or more tasks associated with an entity. The method further includes causing the chatbot to perform the one or more tasks associated with the entity and on behalf of the user. Causing the chatbot to perform the one or more tasks associated with the entity and on behalf of the user includes causing the chatbot to engage in a corresponding conversation with the entity; during the corresponding conversation with the entity: causing the chatbot to render a plurality of instances of textual data for presentation to a representative of the entity; and receiving responsive content that is responsive to at least the given instance of textual data. At least a given instance of textual data, from among the plurality of instances of textual data, conveys details of the one or more tasks associated with the entity. The method further includes causing the responsive content to be provided for presentation to the user of the client device.

These and other implementations of technology disclosed herein can optionally include one or more of the following features.

In some implementations, the method may further include identifying, based on the unstructured free-form natural language input, the entity that is associated with the one or more tasks; determining a corresponding identifier for the entity that is associated with the one or more tasks; and utilizing the corresponding identifier for the entity that is associated with the one or more tasks to cause the chatbot to engage in the corresponding conversation with the entity.

In versions of those implementations, the corresponding identifier for the entity that is associated with the one or more tasks may be one or more of: a corresponding telephone number for the entity, a corresponding email address for the entity, or a corresponding username for the entity. Utilizing the corresponding identifier for the entity that is associated with the one or more tasks to cause the chatbot to engage in the corresponding conversation with the entity may include causing the chatbot to utilize the corresponding identifier for the entity to initiate a text-based messaging session, that is automated on behalf of the user, to perform the one or more tasks associated with the entity.

In some implementations, causing the chatbot to engage in the corresponding conversation with the entity may include causing the chatbot to respond to a text message, email, or other text-based message that is received at the client device and from the representative of the entity; and causing the chatbot to engage in the corresponding conversation with the entity in furtherance of the text message, email, or other text-based message.

In some implementations a method implemented by one or more processors of a remote system is provided, and includes: receiving, at the remote system and from a client device, an indication of unstructured free-form natural language input from a user of the client device; and in response to receiving the indication of the unstructured free-form natural language input that includes the one or more tasks associated with an entity: generating, based on at least the indication of the natural language input and remotely at the remote system, a chatbot to perform the one or more tasks associated with the entity and on behalf of the user. The unstructured free-form natural language input includes one or more tasks associated with an entity. The method further includes causing the chatbot to perform the one or more tasks associated with the entity and on behalf of the user. Causing the chatbot to perform the one or more tasks associated with the entity and on behalf of the user includes causing the chatbot to engage in a corresponding conversation with the entity; during the corresponding conversation with the entity: causing the chatbot to render a plurality of instances of synthesized speech audio data for presentation to a representative of the entity; and receiving responsive content that is responsive to at least the given instance of synthesized speech audio data. At least a given instance of synthesized speech audio data, from among the plurality of instances of synthesized speech audio data, conveys details of the one or more tasks associated with the entity. The method further includes transmitting, from the remote system and to the client device, an indication of the responsive content. Transmitting the indication of the responsive content to the client device causes the client device to provide the responsive content for presentation to the user of the client device.

In some implementations a method implemented by one or more processors of a client device is provided, and includes: receiving, at the client device, unstructured free-form natural language input from a user of the client device, the unstructured free-form natural language input including one or more tasks associated with an entity; in response to receiving the unstructured free-form natural language input that includes the natural language description of the corresponding dialog state map, identifying a chatbot to perform the one or more tasks associated with the entity and on behalf of the user; and causing the chatbot to perform the one or more tasks associated with the entity and on behalf of the user. Causing the chatbot to perform the one or more tasks associated with the entity and on behalf of the user includes causing the chatbot to engage in a corresponding conversation with the entity; during the corresponding conversation with the entity: causing the chatbot to render a plurality of instances of synthesized speech audio data for presentation to a representative of the entity, wherein at least a given instance of synthesized speech audio data, from among the plurality of instances of synthesized speech audio data, conveys details of the one or more tasks associated with the entity; and receiving responsive content that is responsive to at least the given instance of synthesized speech audio data. The method further includes causing the responsive content to be provided for presentation to the user of the client device.

These and other implementations of technology disclosed herein can optionally include one or more of the following features.

In some implementations, identifying the chatbot to perform the one or more tasks associated with the entity and on behalf of the user may include obtaining a previously trained large language model (LLM); and causing the previously trained LLM to be utilized as the chatbot.

In some versions of those implementations, the previously trained LLM may be stored in on-device storage of the client device, and the previously trained LLM that may be stored in the on-device storage of the client device may be a sparsified version of a global previously trained LLM that is available at a remote system communicatively coupled to the client device.

In some versions of those implementations, the method may further include refraining from causing the previously trained LLM to be fine-tuned based on the unstructured free-form natural language input.

In some versions of those implementations, causing the chatbot to render the given instance of synthesized speech, from among the plurality of instances of synthesized speech, for presentation to the representative of the entity may include: processing, using the previously trained LLM, the unstructured free-form natural language input and task data that reflects the details of the one or more tasks associated with the entity, to generate an instance of textual data that reflects a given behavior of the given implicit dialog state; processing, using a text-to-speech (TTS) model, the given instance of textual data that that reflects the given behavior of the given implicit dialog state to generate the given instance of synthesized speech; and transmitting, from the client device and to an additional client device of the representative of the entity, the given instance of synthesized speech. Transmitting the given instance of synthesized speech to the additional client device may cause the additional client device to audibly render the given instance of synthesized speech for presentation to the representative of the entity via one or more speakers of the additional client device.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors of a client device, the method comprising:
receiving, at the client device, unstructured free-form natural language input from a user of the client device, the unstructured free-form natural language input including one or more tasks associated with an entity;

in response to receiving the unstructured free-form natural language input that includes the one or more tasks associated with the entity:

generating, based on at least the unstructured free-form natural language input and locally at the client device, a chatbot to perform the one or more tasks associated with the entity and on behalf of the user; and causing the chatbot to perform the one or more tasks associated with the entity and on behalf of the user, wherein causing the chatbot to perform the one or more tasks associated with the entity and on behalf of the user comprises:

causing the chatbot to engage in a corresponding conversation with the entity;

during the corresponding conversation with the entity:

causing the chatbot to render a plurality of instances of synthesized speech audio data for presentation to a representative of the entity, wherein at least a given instance of synthesized speech audio data, from among the plurality of instances of synthesized speech audio data, conveys details of the one or more tasks associated with the entity; and receiving responsive content that is responsive to at least the given instance of synthesized speech audio data; and causing the responsive content to be provided for presentation to the user of the client device.

2. The method of claim 1, wherein generating the chatbot to perform the one or more tasks associated with the entity and on behalf of the user comprises:

obtaining a previously trained large language model (LLM);

causing the previously trained LLM to be fine-tuned based on the unstructured free-form natural language input to generate a fine-tuned LLM; and utilizing the fine-tuned LLM as the chatbot.

3. The method of claim 2, wherein causing the chatbot to render the given instance of synthesized speech audio data for presentation to the representative comprises:

processing, using the fine-tuned LLM, one or more features of the unstructured free-form natural language input to generate a given instance of textual data that conveys the details of the one or more tasks associated with the entity;

processing, using a text-to-speech (TTS) model, the given instance of textual data that conveys the details of the one or more tasks associated with the entity to generate the given instance of synthesized speech audio data; and transmitting, from the client device and to an additional client device of the representative, the given instance of synthesized speech audio data, wherein transmitting the given instance of synthesized speech audio data to the additional client device causes the additional client device to audibly render the given instance of synthesized speech audio data for presentation to the representative via one or more speakers of the additional client device.

4. The method of claim 3, further comprising:

processing, using the fine-tuned LLM, and along with one or more of the features of the unstructured free-form natural language input, a corresponding context of the corresponding conversation to generate the given instance of textual data that conveys the details of the one or more tasks associated with the entity.

5. The method of claim 3, further comprising:

in response to the given instance of synthesized speech audio data being audibly rendered for presentation to the representative via the one or more speakers of the additional client device:

receiving, at the client device and from the additional client device, a given instance of response audio data that includes the responsive content that is responsive to at least the given instance of synthesized speech audio data;

processing, using an automatic speech recognition (ASR) model, the given instance of response audio data to generate a given instance of response textual data; and determining, based on the given instance of response textual data, whether performance of one or more of the tasks is successfully completed during the corresponding conversation.

6. The method of claim 5, wherein causing the responsive content to be provided for presentation to the user of the client device is in response to determining that one or more of the tasks is successfully completed during the corresponding conversation.

7. The method of claim 5, further comprising:

in response to determining that one or more of the tasks is not successfully completed during the corresponding conversation:

causing the chatbot to render an indication that the user is being prompted to join the corresponding conversation for presentation to the representative of the entity;

generating a prompt that requests the user to join the corresponding conversation; and causing the prompt that requests the user to join the corresponding conversation to be provided for presentation to the user at the client device.

8. The method of claim 7, wherein the prompt further includes a certain reason with respect to why one or more of the tasks is not successfully completed during the corresponding conversation.

9. The method of claim 3, further comprising:

prior to processing one or more of the features of the unstructured free-form natural language input using the fine-tuned LLM:

extracting one or more of the features from the unstructured free-form natural language input.

10. The method of claim 9, wherein one or more of the features are explicitly included in the unstructured free-form natural language input, and wherein extracting one or more of the features from the unstructured free-form natural language input that are explicitly included in the unstructured free-form natural language input comprises:

utilizing an input parser to extract one or more of the features are explicitly included in the unstructured free-form natural language input.

11. The method of claim 9, wherein one or more of the features are implicitly included in the unstructured free-form natural language input, and wherein extracting one or more of the features from the unstructured free-form natural language input that are implicitly included in the unstructured free-form natural language input comprises:

utilizing an input parser to identify one or more of the features are implicitly included in the unstructured free-form natural language input; and utilizing a coreference resolver to extract one or more of the features are implicitly included in the unstructured free-form natural language input.

12. The method of claim 2, wherein the previously trained LLM is stored in on-device storage of the client device, and wherein the previously trained LLM that is stored in the on-device storage of the client device is a sparsified version of a global previously trained LLM that is available at a remote system communicatively coupled to the client device.

13. The method of claim 1, further comprising:
subsequent to causing the chatbot to perform the one or more tasks associated with the entity and on behalf of the user:
discarding the fine-tuned LLM from the on-device storage of the client device; and
refraining from discarding the previously trained LLM from the on-device storage of the client device.

14. The method of claim 1, further comprising:
identifying, based on the unstructured free-form natural language input, the entity that is associated with the one or more tasks;
determining a corresponding identifier for the entity that is associated with the one or more tasks; and
utilizing the corresponding identifier for the entity that is associated with the one or more tasks to cause the chatbot to engage in the corresponding conversation with the entity.

15. The method of claim 14, wherein the corresponding identifier for the entity that is associated with the one or more tasks is a corresponding telephone number for the entity, and wherein utilizing the corresponding identifier for the entity that is associated with the one or more tasks to cause the chatbot to engage in the corresponding conversation with the entity comprises:
causing the chatbot to utilize the corresponding telephone number for the entity to initiate an automated telephone call, that is automated on behalf of the user, to perform the one or more tasks associated with the entity.

16. A method implemented by one or more processors of a remote system, the method comprising:
receiving, at the remote system and from a client device, an indication of unstructured free-form natural language input from a user of the client device, the unstructured free-form natural language input including one or more tasks associated with an entity;
in response to receiving the indication of the unstructured free-form natural language input that includes the one or more tasks associated with an entity:
generating, based on at least the indication of the natural language input and remotely at the remote system, a chatbot to perform the one or more tasks associated with the entity and on behalf of the user; and
causing the chatbot to perform the one or more tasks associated with the entity and on behalf of the user, wherein causing the chatbot to perform the one or more tasks associated with the entity and on behalf of the user comprises:
causing the chatbot to engage in a corresponding conversation with the entity;
during the corresponding conversation with the entity:
causing the chatbot to render a plurality of instances of synthesized speech audio data for presentation to a representative of the entity, wherein at least a given instance of synthesized speech audio data, from among the plurality of instances of synthesized speech audio data, conveys details of the one or more tasks associated with the entity; and
receiving responsive content that is responsive to at least the given instance of synthesized speech audio data; and
transmitting, from the remote system and to the client device, an indication of the responsive content, wherein transmitting the indication of the responsive content to the client device causes the client device to provide the responsive content for presentation to the user of the client device.

17. The method of claim 16, wherein generating the chatbot to perform the one or more tasks associated with the entity and on behalf of the user comprises:
obtaining a previously trained large language model (LLM);
causing the previously trained LLM to be fine-tuned based on the unstructured free-form natural language input to generate a fine-tuned LLM; and
utilizing the fine-tuned LLM as the chatbot.

18. The method of claim 17, wherein the previously trained LLM is stored in remote storage of the remote system, and wherein the previously trained LLM that is stored in the remote storage of the remote system is an unsparsified version of a global previously trained LLM that is available at the remote system communicatively coupled to the client device.

19. The method of claim 17, wherein the fine-tuned LLM is stored in the remote storage of the remote system.

20. A method implemented by one or more processors of a client device, the method comprising:
receiving, at the client device, unstructured free-form natural language input from a user of the client device, the unstructured free-form natural language input including one or more tasks associated with an entity;
in response to receiving the indication of the unstructured free-form natural language input that includes the one or more tasks associated with an entity:
generating, based on at least an indication of the natural language input and locally at the client device, a chatbot to perform the one or more tasks associated with the entity and on behalf of the user; and
causing the chatbot to perform the one or more tasks associated with the entity and on behalf of the user, wherein causing the chatbot to perform the one or more tasks associated with the entity and on behalf of the user comprises:
causing the chatbot to engage in a corresponding conversation with the entity;
during the corresponding conversation with the entity:
causing the chatbot to render a plurality of instances of textual data for presentation to a representative of the entity, wherein at least a given instance of textual data, from among the plurality of instances of textual data, conveys details of the one or more tasks associated with the entity; and
receiving responsive content that is responsive to at least the given instance of textual data; and
causing the responsive content to be provided for presentation to the user of the client device.

* * * * *